US012447765B2

(12) United States Patent
Shimizu et al.

(10) Patent No.: US 12,447,765 B2
(45) Date of Patent: Oct. 21, 2025

(54) LIQUID EJECTOR

(71) Applicant: SEIKO EPSON CORPORATION, Tokyo (JP)

(72) Inventors: Sho Shimizu, Shiojiri (JP); Hiroyuki Santo, Matsumoto (JP); Keigo Iizawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 255 days.

(21) Appl. No.: 18/165,217

(22) Filed: Feb. 6, 2023

(65) Prior Publication Data

US 2023/0249487 A1 Aug. 10, 2023

(30) Foreign Application Priority Data

Feb. 7, 2022 (JP) ................................ 2022-016824

(51) Int. Cl.

| | |
|---|---|
| ***B41M 5/00*** | (2006.01) |
| ***B41J 3/407*** | (2006.01) |
| ***B41J 11/00*** | (2006.01) |
| ***B41J 11/42*** | (2006.01) |
| ***B41J 15/16*** | (2006.01) |
| ***B41J 29/377*** | (2006.01) |

(52) U.S. Cl.

CPC .......... *B41M 5/0011* (2013.01); *B41J 3/4078* (2013.01); *B41J 11/0015* (2013.01); *B41J 11/42* (2013.01); *B41J 15/16* (2013.01); *B41J 29/377* (2013.01)

(58) Field of Classification Search

CPC ........ B41J 11/0015; B41J 15/16; B41J 15/04; B41J 15/02; B41J 29/377; B41J 3/4078; B65H 18/145; B65H 18/08; B65H 18/00; B65H 43/00; B65H 2515/805; B65H 2515/40; B65H 2515/83; B65H 2553/00; B65H 2553/40; B65H 2553/20; B65H 2553/51; B41M 5/0011; D06B 3/00; D06B 3/10; D06B 3/14; D06B 1/08; D06B 1/02; D06P 5/30; B41F 23/02

USPC ....... 399/384; 400/611; 101/484; 347/14, 16

See application file for complete search history.

(56) References Cited

U.S. PATENT DOCUMENTS 4,727,385 A * 2/1988 Nishikawa ........... G03G 21/203 346/146
5,619,807 A * 4/1997 Conrad ................ D21G 1/0093 162/122
2020/0324560 A1* 10/2020 Horie ..................... B41J 3/4078

FOREIGN PATENT DOCUMENTS

JP 2020-172719 A 10/2020

* cited by examiner

*Primary Examiner* — Leslie J Evanisko
*Assistant Examiner* — Thomas Ray Knief
(74) *Attorney, Agent, or Firm* — WORKMAN NYDEGGER

(57) ABSTRACT

A liquid ejector includes a holding unit capable of holding a roll body around which a fabric is wound, a conveyance unit capable of pulling out the fabric from the roll body to convey the fabric, an ejection unit capable of ejecting a liquid to be fabric pulled out from the roll body, and a moisture applying unit that applies moisture to the roll body held by the holding unit.

7 Claims, 14 Drawing Sheets

LIQUID EJECTOR

The present application is based on, and claims priority from JP Application Serial Number 2022-016824, filed Feb. 7, 2022, the disclosure of which is hereby incorporated by reference herein in its entirety.

BACKGROUND

1. Technical Field

The present disclosure relates to a liquid ejector that ejects a liquid on a medium for printing.

2. Related Art

The printer described in JP-A-2020-172719 includes a conveyor belt that conveys a medium such as a fabric, an ejection unit that ejects droplets to the medium, and a vapor applying unit that applies vapor to the medium conveyed by the conveyor belt. The vapor applying unit applies vapor to the unprinted medium to get the medium wet. That is, the moisture content of the medium increases. The printer is an example of a liquid ejector, the vapor is an example of moisture, and the vapor applying unit is an example of a moisture applying unit.

If a fabric has a low moisture content, the fabric is susceptible to wrinkles or being raised up depending on the type of the fabric to be printed on, and thus the image quality deteriorates. In addition, if the fabric has a high moisture content, the fabric is susceptible to smearing when droplets are ejected depending on the type of the fabric to be printed on, and thus the image quality deteriorates. In other words, if a moisture content of a fabric is adjusted to be within a predetermined moisture content range depending on the type of the fabric, deterioration in image quality can be prevented.

Fabrics vary in material, thickness, and the like depending on the types. Fabrics vary in water absorption speed depending on the materials. In addition, if a fabric has a greater thickness, it takes a longer time for moisture of the fabric on the surface where the moisture has been absorbed to reach the surface on the side opposite to the aforementioned surface. Thus, the time from when moisture starts being applied to the fabric from its surface to when the moisture content of the fabric reaches a predetermined moisture content range may be longer than the time in which the liquid ejector processes the fabric depending on the type of the fabric. In other words, because the fabric may be printed on with the moisture content of the fabric not reaching the predetermined moisture content range, there is concern that satisfactory effects brought by the moisture applied to the fabric will not be obtained.

SUMMARY

A liquid ejector to solve the above problem includes a holding unit capable of holding a roll body around which a fabric is wound, a conveyance unit capable of pulling out the fabric from the roll body to convey the fabric, an ejection unit capable of ejecting a liquid to the fabric pulled out from the roll body, and a moisture applying unit that applies moisture to the roll body held by the holding unit.

DESCRIPTION OF EXEMPLARY EMBODIMENTS

Figure 1:
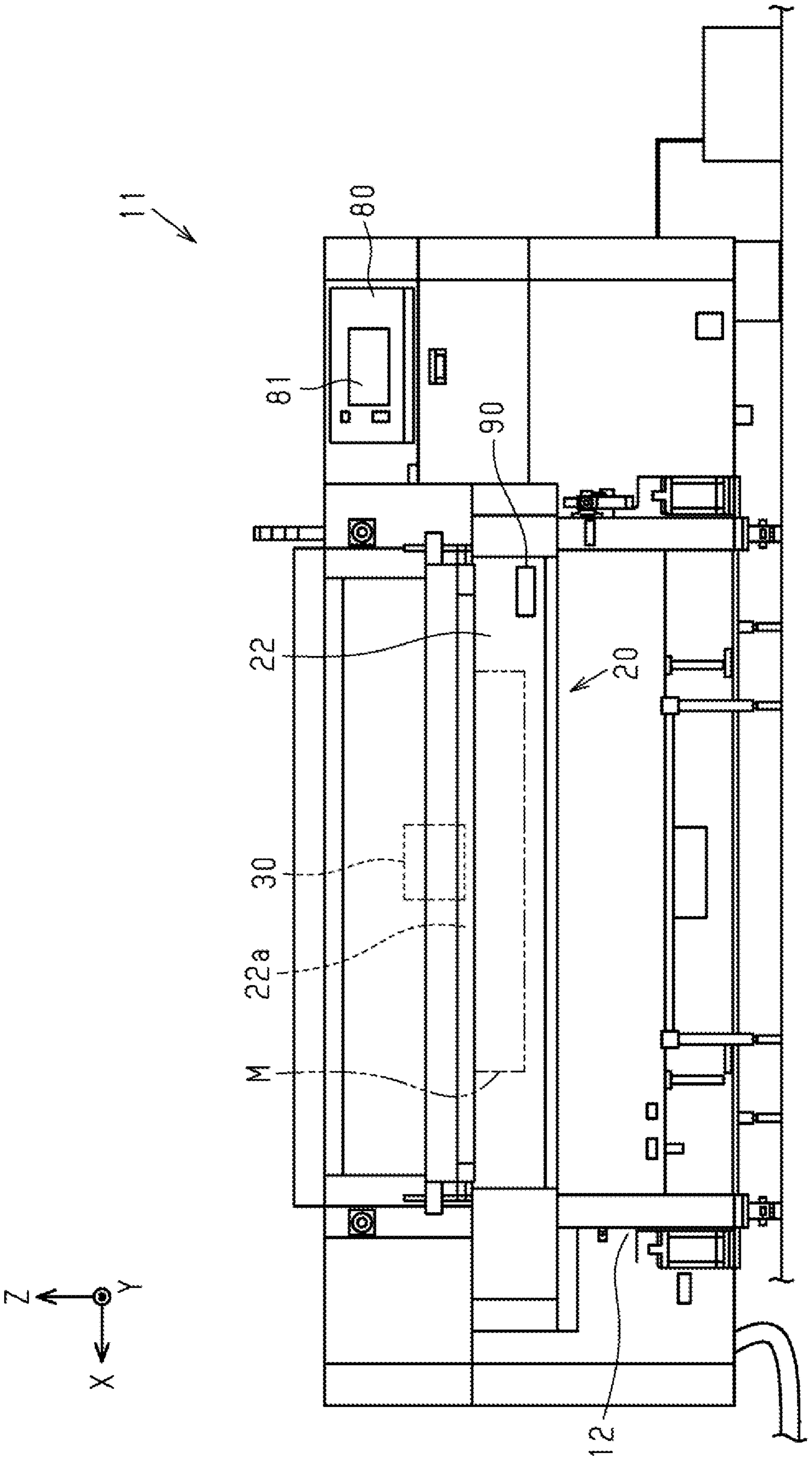
FIG. 1 is a front view illustrating a liquid ejector of first and second embodiments.

A liquid ejector for printing performed by ejecting a liquid on a fabric according to first and second embodiments will be described below with reference to the drawings. The liquid ejector is, for example, an ink jet-type printer that prints characters or images on fabrics by ejecting ink that is an example of a liquid to a fabric. Further, a fabric refers to a textile of cotton, silk, wool, chemical fiber, or a mixed one made by alternately weaving warp and weft threads.

In the drawings, based on the assumption that the liquid ejector is placed on a horizontal surface, the direction of gravity is indicated by a Z axis and directions along the horizontal surface are indicated by an X axis and a Y axis. The X axis, the Y axis, and the Z axis are mutually orthogonal. In the following description, the direction along the X axis is referred to as a width direction X, the direction along the Y axis is referred to as a depth direction Y, and the direction along the Z axis is referred to as a gravity direction Z. Further, the width direction X is a width direction X of a conveyed fabric. In addition, since the depth direction Y is the direction in which a fabric is conveyed when a printing unit performs printing, it is also referred to as a conveyance direction Y.

First Embodiment

Regarding Configuration of Liquid Ejector

A liquid ejector 11 includes a housing 12 having a column-beam structure and an operation unit 80 as illustrated in FIG. 1. The operation unit 80 is operated by a user, and has, for example, a display unit 81 including a touch panel-type liquid crystal screen, and the like, operation buttons, and the like.

The liquid ejector 11 includes a conveyance unit 20 that uses a support surface 22*a* as a support unit to support a fabric M with the support surface 22*a* to convey the fabric M and a printing unit 30 that performs a recording operation by ejecting a liquid to the fabric M supported by the support surface 22*a*. The liquid ejector 11 includes a control unit 90 that controls each unit of the liquid ejector 11 such as the conveyance unit 20 and the printing unit 30.

Figure 2:
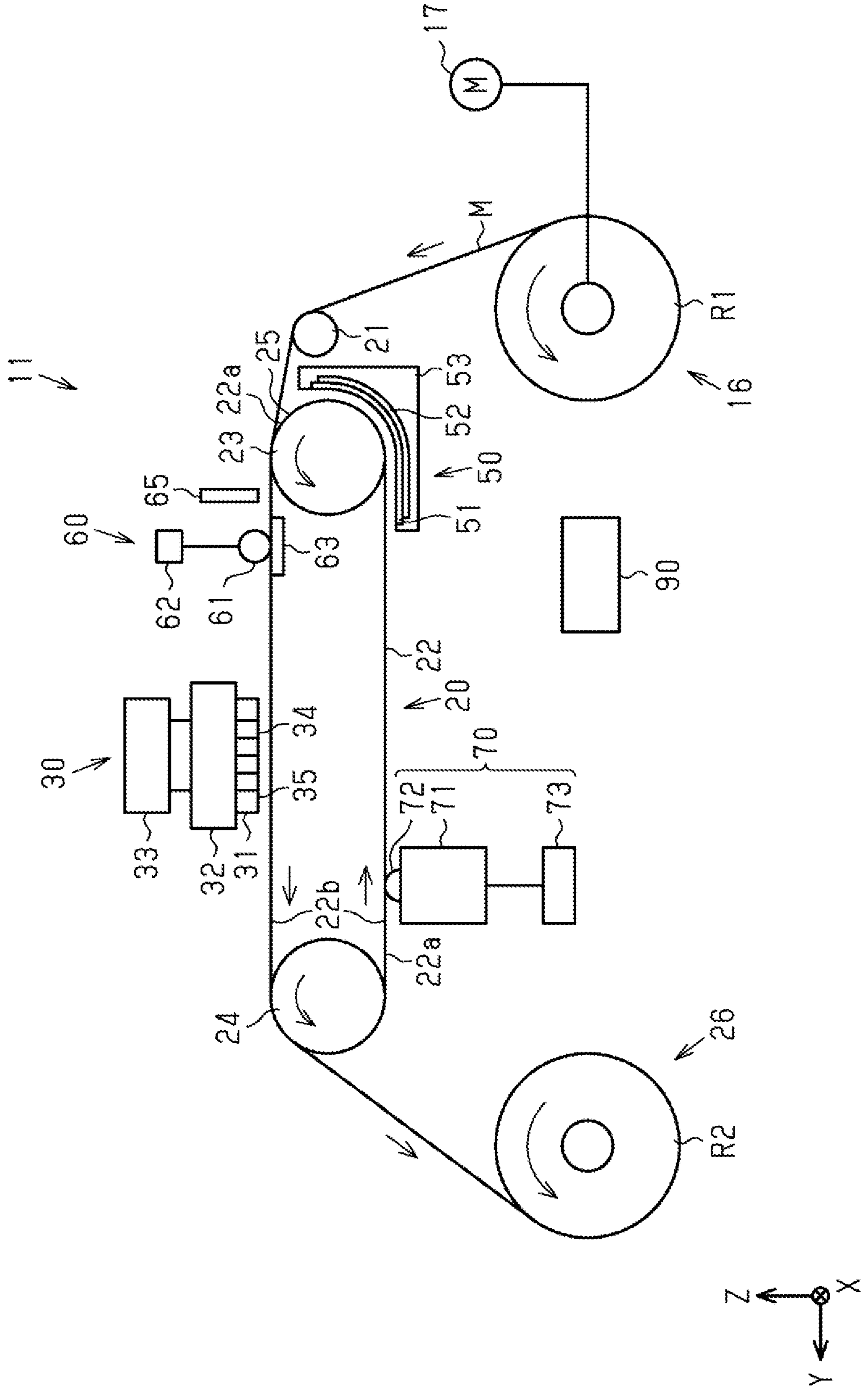
FIG. 2 is a schematic side view illustrating the liquid ejector of the first and second embodiments.

The conveyance unit 20 includes a conveyor belt 22, a rotary roller 23, and a drive roller 24 as illustrated in FIG. 2. The rotary roller 23 is disposed upstream of the printing unit 30 in the conveyance direction Y. The drive roller 24 is disposed downstream of the printing unit 30 in the conveyance direction Y. The conveyor belt 22 is formed of an endless rubber member wound around the rotary roller 23 and the drive roller 24. The conveyor belt 22 is retained, with a predefined tension being acting, such that the region on the conveyance route between the rotary roller 23 and the drive roller 24 is horizontal.

The rotary roller 23 and the drive roller 24 support an inner circumferential surface 22*b* of the conveyor belt 22. The drive roller 24 includes a motor, which is not illustrated, configured to rotate and drive the drive roller 24. When the drive roller 24 is rotated, the conveyor belt 22 rotates according to the rotation of the drive roller, and the rotary roller 23 rotates following the rotation of the conveyor belt 22.

The conveyor belt 22 is circulated by the drive roller 24 in the direction of the solid-line arrows shown in FIG. 2, thereby conveying the fabric M supported by the support surface 22*a* in the direction of the solid-line arrows shown in FIG. 2. Then, the fabric M is conveyed to the printing unit 30 in the conveyance direction Y by the conveyor belt 22, and the fabric M is printed on by the printing unit 30.

The conveyance unit 20 includes a feeding unit 16 that feeds the fabric M wound into a roll shape as illustrated in FIG. 2. The feeding unit 16 supports a roll body R1 on which the fabric M has been wound such that the rotational axis direction of the roll body R1 is the width direction X. The feeding unit 16 feeds the fabric M toward the conveyor belt 22 when the roll body R1 is rotated by a feeding motor 17 in the direction of the solid-line arrow illustrated in FIG. 2. That is, the conveyance unit 20 is configured to pull the fabric M out from the roll body R1 around which the fabric M has been wound to convey the fabric M toward the printing unit 30. The feeding unit 16 is controlled by the control unit 90. Further, details of a configuration of the feeding unit 16 will be described below.

The conveyance roller 21 relays the fabric M fed from the feeding unit 16 to the conveyor belt 22. In this way, the fabric M is supported by the support surface 22*a* of the conveyor belt 22.

The outer circumferential surface of the conveyor belt 22 is the support surface 22*a* that supports the fabric M. The conveyor belt 22 may include an adhesive layer 25 that is configured to allow the fabric M to be attached thereto by applying an adhesive onto the support surface 22*a*. In the present embodiment, the conveyor belt 22 includes the adhesive layer 25 on the support surface 22*a*.

The liquid ejector 11 may include a heating unit 50 configured to be capable of heating the conveyor belt 22, and a pressing unit 60 configured to be capable of pressing the fabric M against the conveyor belt 22 heated by the heating unit 50 as in the present embodiment as illustrated in FIG. 2. The adhesive layer 25 of the conveyor belt 22 exhibits stickiness when being heated by the heating unit 50. The fabric M fed from the feeding unit 16 is pressed against the adhesive layer 25 by the pressing unit 60. Then, the adhesive layer 25 adheres to the fabric M, and thus the conveyor belt 22 firmly supports the fabric M. That is, the conveyor belt 22 is configured to be able to convey the fabric M with the adhesive layer 25. This makes it possible to prevent deterioration in the image quality that is caused when the elastic fabric M floats from the support surface 22*a* at the time of printing.

The route on which the conveyor belt 22 circulates in the direction of the solid-line arrows illustrated in FIG. 2 is referred to as a circulation route. Then, of the circulation route, the route on which the fabric M is conveyed is assumed as a conveyance route, and the route that is the other route and does not constitute the conveyance route for the fabric M is assumed as a conveyance preparation route. That is, the conveyance preparation route is the route other than the conveyance route of the circulation route. Thus, the conveyance route is the route from a position where the fed fabric M is pressed against the conveyor belt 22 by the pressing unit 60 to a position where the fabric M having printed thereupon is separated from the conveyor belt 22.

On the conveyance route, the support surface 22*a* of the circulating conveyance route 22 supports the fabric M on the side facing the printing unit 30, and the fabric M is conveyed from the rotary roller 23 side to the drive roller 24 side. In addition, on the conveyance preparation route, the support surface 22*a* of the conveyor belt 22 faces a cleaning unit 70 and the heating unit 50 to be described later as the support surface 22*a* circulates. In this way, on the conveyance preparation route, only the conveyor belt 22 including the adhesive layer 25, that is, the conveyor belt 22 that is not supporting the fabric M, moves from the drive roller 24 to the rotary roller 23.

The heating unit 50 includes a radiation plate 51 that emits heat to the adhesive layer 25 of the conveyor belt 22, a heating plate 52 affixed to the radiation plate 51, and a heating frame 53 that fixes the radiation plate 51 and the heating plate 52 as illustrated in FIG. 2. The radiation plate 51 is installed with the inner surface of the radiation plate 51 facing the support surface 22*a* of the conveyor belt 22 separated therefrom by a predetermined distance.

The radiation plate 51 and the heating plate 52 extend in the width direction X of the conveyor belt 22. With respect to the length of the radiation plate 51 in the width direction X and the length of the heating plate 52 in the width direction X, both end portions of the plates are slightly longer than the length of the conveyor belt 22 in the width direction X. For example, an aluminum plate member is used for the radiation plate 51, and is formed to be curved in one direction. The heating plate 52 is, for example, a sheet-shaped heater. The sheet-shaped heater is configured such that a heating element such as metal foil is sandwiched inside a sheet member such as a synthetic resin having flexibility, and thus heat is generated with a substantially uniform temperature distribution.

In order for the radiation plate 51 to emit radiant heat toward the conveyor belt 22, the heating plate 52 heats the radiation plate 51 while the heating plate 52 is affixed to the outer surface of the radiation plate 51. The heating frame 53 fixes the radiation plate 51 with the inner surface of the radiation plate 51 to which each heating plate 52 is attached facing the support surface 22*a* of the conveyor belt 22.

When power is supplied to the sheet-shaped heater, the heating element generates heat, and the heat is transmitted to the radiation plate 51 through the sheet member. The radiation plate 51 is warmed by the heat transmitted from the heating plate 52. The warmed radiation plate 51 emits radiant heat toward the support surface 22*a* of the conveyor belt 22 that the radiation plate 51 is facing. In this manner, the adhesive layer 25 is heated.

The liquid ejector 11 includes a belt temperature detection unit 65 that detects a temperature of the adhesive layer 25 as illustrated in FIG. 2. The belt temperature detection unit 65 is provided upstream of the pressing unit 60 and downstream of the heating unit 50 in the conveyance direction Y of the conveyor belt 22. The fabric M is pressed against the adhesive layer 25 by the pressing unit 60 located downstream of the belt temperature detection unit 65. Thus, the belt temperature detection unit 65 is configured to detect the temperature of the adhesive layer 25 immediately before the fabric M adheres to the adhesive layer 25.

The heating unit 50 is controlled by the control unit 90 based on the result of the belt temperature detection unit 65 detecting the temperature of the adhesive layer 25. For example, an infrared sensor is used for the belt temperature detection unit 65. A pair of belt temperature detection units 65 is disposed on the outer sides of both ends of the fabric M in the width direction X at a position facing the adhesive layer 25. In other words, the belt temperature detection units 65 are installed one by one at both ends in the width direction X that do not interfere with the fabric M. Thus, the belt temperature detection unit 65 can detect the temperature of the adhesive layer 25 even when the fabric M is being conveyed by the support surface 22*a*.

The pressing unit 60 is provided upstream of the printing unit 30 and downstream of the heating unit 50 in the conveyance direction Y of the conveyor belt 22 as illustrated in FIG. 2. The pressing unit 60 includes a pressing roller 61, a pressing roller drive unit 62, and a roller support unit 63. The pressing roller 61 is formed in a cylindrical shape or a columnar shape extending in the width direction X, and is configured to be rotatable in the circumferential direction along the cylindrical surface of the pressing roller 61. The roller support unit 63 is provided on the inner circumferential surface 22*b* side facing the pressing roller 61 having the conveyor belt 22 interposed between the roller support unit 63 and the pressing roller 61.

The length of the pressing roller 61 in the width direction X is substantially the same as the length of the conveyor belt 22 in the width direction X. The length of the fabric M in the width direction X is shorter than the lengths of the pressing roller 61 and the conveyor belt 22 in the width direction X. The length of the roller support unit 63 in the width direction X is substantially the same as the length of the pressing roller 61 in the width direction X.

The pressing roller drive unit 62 presses the pressing roller 61 against the support surface 22*a* of the conveyor belt 22. The pressed pressing roller 61 rotates following movement of the conveyor belt 22 in the conveyance direction Y. The fabric M superimposed on the conveyor belt 22 is pressed against the conveyor belt 22 between the pressing roller 61 and the roller support unit 63 and conveyed. While the conveyor belt 22 and the fabric M having the adhesive layer 25 are sandwiched between the pressing roller 61 and the roller support unit 63, the fabric M is pressed against the adhesive layer 25 by the operation of the pressing unit 60, and thus the fabric M adheres to the support surface 22*a*. That is, the fabric M is firmly supported by the support surface 22*a*.

The conveyance unit 20 includes a winding unit 26 that winds the printed fabric M. The winding unit 26 rotates a roll body R2 in the direction of the solid-line arrow illustrated in FIG. 2 using a rotation drive unit, which is not illustrated, to cause the printed fabric M to be separated from the adhesive layer 25 of the conveyor belt 22 and wound in a roll shape. That is, the winding unit 26 winds the printed fabric M. The winding unit 26 supports the roll body R2 on which the fabric M has been wound such that the rotational axis direction of the roll body R2 is the width direction X. Operations of the rotation drive unit are controlled by the control unit 90.

The printing unit 30 is disposed on the support surface 22*a* side that is above the conveyor belt 22 moving in the conveyance direction Y, and performs printing on the fabric M supported on the support surface 22*a* as illustrated in FIG. 2. The printing unit 30 includes an ejection unit 31, a carriage 32 on which the ejection unit 31 is mounted, and a carriage moving unit 33 that moves the carriage 32. The ejection unit 31 is configured to be able to eject a liquid onto the fabric M supported by the conveyor belt 22. That is, the ejection unit 31 is configured to be able to eject a liquid onto the fabric M pulled out from the roll body R1.

The ejection unit 31 includes a nozzle plate 35 on which a plurality of nozzle rows 34 are formed. For example, at least four nozzle rows 34 are formed on the nozzle plate 35. In addition, the ejection unit 31 is configured to be able to eject ink of different colors, for example, cyan, magenta, yellow, and black ink from the ink rows 34. The nozzle plate 35 faces the fabric M conveyed by the conveyor belt 22.

The carriage moving unit 33 moves the ejection unit 31 in the width direction X. The carriage 32 on which the ejection unit 31 is mounted is supported by a guide rail, which is not illustrated and disposed in the width direction X, and thus is configured to be able to reciprocate in the width direction X by the carriage moving unit 33.

The carriage moving unit 33 includes a motor, which is not illustrated, as a power source to move the carriage 32 in the width direction X. When the motor is driven by control of the control unit 90, the ejection unit 31 reciprocates together with the carriage 32 in the width direction X.

In the present embodiment, the ejection unit 31 mounted on the carriage 32 ejects a liquid to the fabric M while moving in the width direction X of the fabric M. That is, the ejection unit 31 of a serial head type is used. Further, the ejection unit 31, which is fixed at a position in the width direction X, may have a nozzle row across the width direction X of the fabric M. That is, the ejection unit 31 of a line head type may be used.

The conveyor belt 22 is folded back by the drive roller 24 after the printed fabric M is separated from the conveyor belt 22 by the winding unit 26, and moves to the conveyance preparation route. Further, when printing has been performed on the fabric M on the conveyance route, ink that has passed through the fabric M, ink that has been smudged from the end of the fabric M in the width direction X, fibers that have fallen out from the fabric M, and the like adhere to the adhesive layer 25 of the conveyor belt 22.

The liquid ejector 11 includes the cleaning unit 70 that cleans the conveyor belt 22 as illustrated in FIG. 2. The cleaning unit 70 cleans the conveyor belt 22 moving on the conveyance preparation route with a cleaning solution, thereby removing ink, fibers, and the like adhering to the adhesive layer 25. The cleaning unit 70 is disposed below the endless conveyor belt 22 on the drive roller 24 side, and cleans the support surface 22*a* including the adhesive layer 25 of the conveyor belt 22 from below.

The cleaning unit 70 includes a cleaning tank 71 that stores the cleaning solution, a cleaning roller 72 that is immersed in the cleaning solution and comes in rotatably contact with the conveyor belt 22, and a movement mechanism unit 73 that uses an air cylinder that vertically moves the cleaning unit 70, and is not illustrated. In addition, the cleaning unit 70 includes a motor, which is not illustrated, as a power source that rotates and drives the cleaning roller 72.

The cleaning roller 72 is configured as a rotary brush having a length that is the same as or slightly longer than the length of the conveyor belt 22 in the width direction X. In addition, the cleaning roller 72 has a rotational shaft extending in the width direction X, which is not illustrated. Both ends of the rotational shaft are rotatably supported on both walls of the cleaning tank 71.

The cleaning unit 70 is moved upward by the movement mechanism unit 73 to come into contact with the support surface 22*a* of the conveyor belt 22 moving on the conveyance preparation route. Then, the cleaning unit 70 rotates the cleaning roller 72 containing the cleaning solution to clean the support surface 22*a* including the adhesive layer 25.

Regarding Configuration of Each Unit Around Feeding Unit

Figure 3:
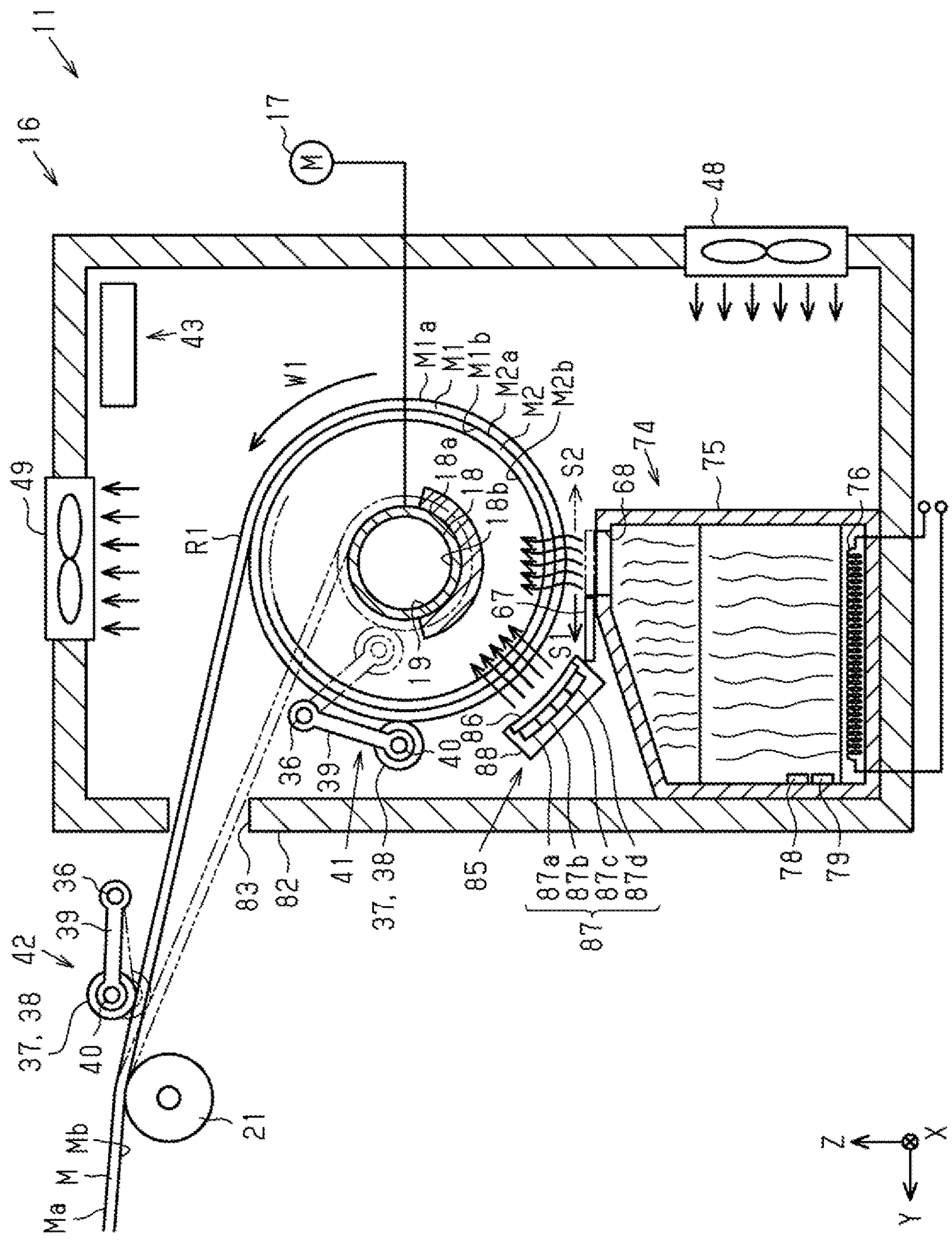
FIG. 3 is a schematic side view illustrating a feeding unit of the first embodiment.

The feeding unit 16 includes a shaft member 18 around which the fabric M is wound, and a pair of holding units 19 that hold the shaft member 18 at both ends of the shaft member 18 in the X-axis direction as illustrated in FIG. 3. For short, the holding units 19 are configured to be able to hold the roll body R1 around which the fabric M is wound. The holding units 19 rotatably holds the roll body R1.

The feeding unit 16 is configured such that the speed at which the fabric M is pulled out from the roll body R1 toward the conveyor belt 22 is the same as the speed of the conveyor belt 22. For example, the rotation speed of the feeding motor 17 may be controlled by the control unit 90 detecting the diameter of the roll body R1 in accordance with the diameter of the roll body R1 such that the speed at which the fabric M is pulled out from the roll body R1 is the same as the speed of the conveyor belt 22. For example, by detecting a tension of the fabric M being pulled, a rotation speed of the feeding motor 17 may be controlled by the control unit 90 according to the tension of the pulled fabric M such that the speed at which the fabric M is pulled out from the roll body R1 is the same as the speed of the conveyor belt 22. For example, the feeding unit 16 may include a slip clutch on the rotational axis of the roll body R1, without the feeding motor 17, and the fabric M may be pulled out as much as the conveyor belt 22 conveys the fabric M. The slip clutch is a mechanism that slips when a rotational torque exceeds a predetermined torque. That is, when the conveyor belt 22 performs conveyance, the slip clutch enables the fabric M to be pulled out as much as the conveyor belt 22 conveys the fabric M.

In the present embodiment, because the roll body R1 rotates in the counterclockwise direction W1 when the feeding motor 17 rotates the shaft member 18 in the counterclockwise direction W1, the fabric M is pulled out from the roll body R1.

In the present embodiment, the roll body R1 is formed by winding the fabric M around the shaft member 18. That is, the roll body R1 includes the shaft member 18. However, the roll body R1 may not include the shaft member 18. For example, the holding units 19 may be configured by disposing at least two rollers having a length similar to that of the roll body R1 below the roll body R1, and supporting the outermost circumferential surface of the roll body R1 with the rollers. In addition, the fabric M may be pulled out from the roll body R1 as the rollers are rotated and driven to have the same circumferential speed as the belt conveyance speed, and the roll body R1 is rotated following the rotation of the rollers.

The liquid ejector 11 includes a housing unit 82 that can house the roll body R1 inside. The housing unit 82 includes an opening 83 through which the fabric M can pass from the inside of the housing unit 82 to the outside of the housing unit 82. After the fabric M is pulled out from the roll body R1 housed inside the housing unit 82, the fabric M passes through the opening 83, and is relayed to the conveyance roller 21 located outside the housing unit 82, and a supported surface Mb of the fabric M is supported by the conveyor belt 22.

The liquid ejector 11 includes a moisture applying unit 74 that applies moisture to the roll body R1 in the housing unit 82. In the present embodiment, the moisture applying unit 74 applies moisture to the roll body R1 by applying vapor to the roll body R1. Vapor is applied as moisture to the roll body R1 via air inside the housing unit 82. The moisture applying unit 74 is controlled by the control unit 90.

Vapor refers to a vaporized form of a substance. Water vapor refers to a vaporized form of water. In addition, in this specification, vapor and water vapor are synonymous. However, vapor and water vapor described herein may include components other than moisture such as moisturizers or softeners. In addition, vapor and water vapor described herein may be mist. Further, mist refers to fine water droplets floating in the air having a molecular weight larger than that of vapor that vaporizes when heated. When mist is used, the liquid ejector 11 has the same effect as when vapor and water vapor are used.

The moisture applying unit 74 has a discharge port 68 through which vapor generated therein is discharged upward to the outside. Since the discharge port 68 that releases vapor is positioned below the rotation center of the roll body R1, the vapor moving upward from the inside of the moisture applying unit 74 can be applied to the roll body R1 as moisture.

The moisture applying unit 74 includes a tank 75 that contains water to discharge vapor, and a heater 76 for heating the water contained in the tank 75. The inside of the tank 75 is replenished with water to be contained in the tank 75 through a replenishment port (not illustrated) by a user, for example. The heater 76 is disposed below the tank 75 and heats the water contained in the tank 75 from below.

The moisture applying unit 74 includes a water level detection unit 78 and a water temperature detection unit 79 in the tank 75. The water level detection unit 78 is configured to be able to detect a level of water contained in the tank 75 when it is lower than a predetermined level because the water contained in the tank 75 has evaporated. When the level of water is lower than the predetermined level, for example, a message prompting replenishment of the tank 75 with water is displayed on the display unit 81 illustrated in FIG. 1.

The water temperature detection unit 79 is configured to be able to detect a temperature of the water contained in the tank 75. The moisture applying unit 74 may have an agitation mechanism that agitates the water contained in the tank 75. The agitation mechanism agitates the water contained in the tank 75 by, for example, rotating a rotational shaft having a plurality of blades in the tank 75 in the horizontal direction, the vertical direction, or the like. This prevents the temperature distribution of the water inside the tank 75 from being uneven.

The moisture applying unit 74 is configured to be able to adjust an output of the heater 76. An output of the heater 76 refers to the amount of heat applied to the water in the tank 75. The temperature of the water in the tank 75 changes depending on the amount of heat applied to the water in the tank 75. Since the heater 76 is constituted by, for example, a plurality of heating wires, the number of heating wires to be energized can be changed depending on when the temperature of the water in the tank 75 is raised, when the temperature of the water in the tank 75 is maintained, and when the temperature of the water in the tank 75 is lowered. More specifically, it may be configured such that, for example, the temperature of the water is raised by energizing two heating wires, the temperature of the water is maintained by energizing one heating wire, and the temperature of the water is lowered by energizing no heating wire. Furthermore, the current flowing through the heater 76 may be adjusted to adjust the amount of heat applied to the water.

When the output of the heater 76 increases, the temperature of the water contained in the tank 75 rises, and when the output of the heater 76 decreases, the temperature of the water contained in the tank 75 drops. In addition, the temperature of the water contained in the tank 75 is adjusted by adjusting the output of the heater 76. The higher the temperature of the water contained in the tank 75, the greater the amount of vapor, and the lower the temperature of the water contained in the tank 75, the smaller the amount of vapor. The amount of vapor refers to the amount of water evaporated in air per time within the tank 75. In addition, the output of the heater 76 is adjusted, for example, such that the temperature of the water falls in the range from 30 degrees to 40 degrees, and thus the amount of vapor will have a constant value.

Furthermore, the amount of moisture applied to the roll body R1 becomes greater as the amount of vapor increases, and the amount of moisture applied to the roll body R1 decreases as the amount of vapor decreases. That is, the moisture applying unit 74 is configured to be able to adjust the amount of moisture to be applied to the roll body R1.

The moisture applying unit 74 of the present embodiment is an example of a moisture applying unit. The moisture applying unit may be configured to be able to adjust the amount of moisture to be applied to the roll body R1. For example, it may be configured that a plurality of ultrasonic generators are provided in the tank 75, then vibration of the ultrasonic waves is transmitted to the water surface in the tank 75, and thus fine mist generated when part of the water surface rises is discharged from the discharge port 68. In addition, the moisture applying unit may adjust the amount of moisture applied to the roll body R1 in accordance with the number of ultrasonic generators to be driven and the time for which the ultrasonic generators are driven.

For example, the water in the tank 75 may be nebulized using centrifugal force of a disc rotating at a high speed to generate fine mist, the air and the fine mist may be mixed using a fan rotating together with the disk, and the mixture may be discharged from the discharge port 68. In addition, the moisture applying unit may adjust the amount of moisture applied to the roll body R1 according to a rotational speed of the disk, a length of rotation time, or the like.

For example, the moisture applying unit may include a water supply roll that supplies dampening water for printing to the roll body R1. The moisture applying unit includes a plurality of water supply rolls having different film thicknesses of the water formed on the surface, and may switch the water supply roller to be nipped at the roll body R1 to adjust the amount of moisture to be applied to the roll body R1. It is not necessary to apply moisture to the roll body R1 through the air in the housing unit 82 as described above. Furthermore, the moisture applying unit may be brought in contact with the roll body R1 to apply moisture to the roll body R1 without passing through the air.

The moisture applying unit 74 may have a shutter 67 that closes the discharge port 68. The shutter 67 is moved in the release direction S1 to open the discharge port 68. In addition, when the shutter 67 is moved in the closing direction S2 to close the discharge port 68, it is possible to prevent the vapor generated inside the moisture applying unit 74 from being applied to the roll body R1.

Since the discharge port 68 is positioned below the rotation center of the roll body R1, the vapor discharged from the discharge port 68 toward the roll body R1 is primarily transmitted in the direction to the center of the roll body R1 when it reaches a surface of the roll body R1. The surface of the roll body R1 is an outer surface M1*a* of a fabric M1 of the first round. Since the fabric M has air permeability, the fabric M allows water in the vapor state to pass through. More specifically, when water vapor reaches the outer surface M1*a* of the fabric M1 of the first round, water in the vapor state passes through the voids in the weave of the fabric M to an inner surface M1*b*, and passes through the fabric M1 in the thickness direction that is the radial direction of the roll body R1. Along with that, when the water vapor comes in contact with the fabric M1 having a low moisture content, the water vapor becomes water in the liquid state at the portion of the fabric M1 at which the water vapor has passed, and thus moisture penetrates the fabric M1. In addition, moisture penetrates also in the circumferential direction of the roll body R1. Further, the fabric M1 of the first round refers to the fabric M on the outermost circumference. The outer surface M1*a* of the fabric M1 of the first round comes in contact with the surrounding air.

When the amount of moisture applied by the moisture applying unit 74 increases, the distance in which water vapor passes through the fabric M1 increases. Water vapor that has passed toward the inner surface M1*b* in the thickness direction of the fabric M1, which is the radial direction of the roll body R1, reaches the inner surface M1*b*, and at the same time reaches the outer surface M2*a* of the fabric M2 of the second round adhering to the inner surface M1*b*. Furthermore, when the amount of moisture applied by the moisture applying unit 74 further increases, the water vapor continues to pass from the outer surface M2*a* of the fabric M2 of the second round toward the inner surface M2*b* in the thickness direction of the fabric M2 that is the radial direction of the roll body R1. Also, when the water vapor comes in contact with the fabric M2 having a low moisture content, the water vapor becomes water in the liquid state at the portion of the fabric M2 at which the water vapor has passed, and thus moisture penetrates the fabric M2.

When the amount of moisture applied by the moisture applying unit 74 further increases, the water vapor continuously passes through the inner side of the fabric M in the thickness direction. Along with that, when the water vapor comes in contact with the fabric M having a low moisture content, the water vapor becomes water in the liquid state at the further inner portion of the fabric M at which the water vapor has passed, and thus moisture penetrates the fabric M. Since moisture is applied from the outer surface M1*a* of the roll body R1, the amount of moisture that penetrates the fabric M decreases from the outer surface M1*a* of the roll body R1 toward the inner portion away therefrom. However, when moisture is applied to the fabric M1 of the first round, some degree of moisture can be applied to the fabric M from the second round as well.

The liquid ejector 11 includes a first detection unit 41 capable of detecting a first moisture content of a surface of the roll body R1. The first detection unit 41 includes an arm 39 and two rollers 37 and 38. The arm 39 has a rotational central axis 40 at one end thereof. In addition, the two rollers 37 and 38 are configured to be rotatable with respect to the rotational central axis 40 as a rotation center. Further, the two rollers 37 and 38 are disposed at separated positions in the width direction X, and the roller 37 does not come in contact with the roller 38. The arm 39 has a turning central axis 36 at the other end. In addition, the arm 39 is configured to be turnable with the turning central axis 36 as a turning center. Thus, the arm 39 is biased by a biasing member, which is not illustrated, and thus the two rollers 37 and 38 are pressed against the outer surface M1*a* of the fabric M1.

The first detection unit 41 measures a resistance value of the fabric M1 between the rollers 37 and 38 when the two rollers 37 and 38 come in contact with the fabric M1 at different locations, and a current flows between the rollers 37 and 38. It is preferred that the position of the first detection unit 41 in the width direction X be kept unchanged as far as possible. In particular, it is preferred that the distance between the rollers 37 and 38 in the width direction X be kept unchanged as far as possible. This is because the resistance value of the fabric M1 changes in accordance with measurement conditions such as the position of the first detection unit 41 or the distance between the rollers 37 and 38. Thus, it is preferred that the measurement conditions of the first detection unit 41 be kept unchanged as far as possible regardless of the detection scheme of the first detection unit 41. The resistance value of the fabric M1 depends on the moisture content of the fabric M1. For this reason, the first detection unit 41 detects a first moisture content by converting the resistance value into moisture content. That is, the output value of the first detection unit 41 is a first moisture content. Alternatively, for example, the output value of the first detection unit 41 may be a voltage value, and the voltage value may be converted into moisture content in the control unit 90. Further, the moisture content is an amount indicating the degree to which moisture is contained in the fabric M or the fabric M1, and also includes ratio, that is, percentage of moisture in addition to weight. A percentage of moisture is a proportion of the weight of moisture contained in fabric M with respect to the weight of the fabric M (fabric M1).

The first detection unit 41 of the present embodiment is an example of a first detection unit. The first detection unit 41 may be configured to be able to detect the first moisture content of the outer surface M1*a* of the roll body R1. For example, the first detection unit 41 is a high-frequency moisture meter, and the first detection unit 41 measures a dielectric constant of the fabric M1. In addition, the first detection unit 41 may detect the first moisture content by converting the dielectric constant into moisture content. In addition, for example, the first detection unit 41 is a near-infrared reflection-type moisture meter, and the first detection unit 41 emits light including near-infrared light to measure the amount of light including the near-infrared light absorbed by moisture using reflection light. In addition, the first detection unit 41 may detect the first moisture content by converting the amount of absorbed light into moisture content.

In the present embodiment, the first detection unit 41 is provided upstream of the moisture applying unit 74 in the direction of rotation of the roll body R1. The first moisture content detected by the first detection unit 41 is a moisture content of the fabric M1 to which moisture has been applied through the other fabric M being in contact with the fabric M1. After the first detection unit 41 detects the first moisture content, the moisture applying unit 74 applies moisture to the outer surface M1*a* of the fabric M1. Thus, it is possible to adjust the amount of moisture applied to the outer surface M1*a* of the fabric M1 of the first round in accordance with the moisture content of the fabric M1 to which moisture has been applied through the other fabric M being in contact with the fabric M1.

The liquid ejector 11 includes a second detection unit 42 capable of detecting a second moisture content of the surface of the fabric M that has been pulled out from the roll body R1 before the ejection unit 31 ejects the liquid. That is, an output value of the second detection unit 42 is a second moisture content. Further, a surface on which the ejection unit 31 will eject the liquid will be referred to as a printed surface Ma. The second moisture content detected by the second detection unit 42 is a moisture content of the fabric M1 to which moisture has been applied from the outer surface M1*a* of the fabric M1 by the moisture applying unit 74. The second detection unit 42 detects the second moisture content after the moisture applying unit 74 applies moisture to the outer surface M1*a* of the fabric M1. Whether the amount of moisture applied by the moisture applying unit 74 is an appropriate amount can be verified based on the second moisture content detected by the second detection unit 42. Accordingly, an amount of moisture applied thereafter can be adjusted. That is, the amount of moisture applied to the outer surface M1*a* of the fabric M1 of the first round can be adjusted in accordance with the second moisture content of the printed surface Ma of the fabric M that has been pulled out from the roll body R1 before the ejection unit 31 ejects the liquid.

The configuration of the second detection unit 42 is the same as the configuration of the first detection unit 41, and thus description of the configuration of the second detection unit 42 is omitted. Further, the liquid ejector 11 may include the first detection unit 41 but not include the second detection unit 42, and the liquid ejector 11 may include the second detection unit 42 but not include the first detection unit 41. When the liquid ejector 11 includes the first detection unit 41 and the second detection unit 42, the position or region of the fabric M (fabric M1) from which moisture is detected by the first detection unit 41 in the width direction X is preferably substantially the same as the position and region of the fabric M from which moisture is detected by the second detection unit 42.

The liquid ejector 11 includes a first air intake fan 48 as an air intake portion and a first discharge fan 49 as a discharge portion. The first air intake fan 48 takes air into the housing unit 82 from the outside of the housing unit 82. The first discharge fan 49 discharges air from the inside of the housing unit 82 to the outside of the housing unit 82. In addition, at least one of the first air intake fan 48 and the first discharge fan 49 is configured to be able to adjust the volume of flowing air.

The first air intake fan 48 is preferably disposed at a position opposite to the position at which the fabric M is pulled out from the roll body R1 with respect to the rotation center of the roll body R1. It is possible to prevent a posture in which the fabric M is pulled out from the roll body R1 from being disturbed.

The first discharge fan 49 is preferably disposed above the roll body R1 and at the center of the housing unit 82. Since water vapor is released upward from below the roll body R1, it moves above the roll body R1 passing through the roll body R1 and the surroundings of the roll body R1 while moisture is being applied to the roll body R1. Such water vapor can be discharged out of the housing unit 82 by the first discharge fan 49. More specifically, moisture-enriched air accumulated above can be discharged to the outside of the housing unit 82 in order to prevent the moisture-enriched air from being condensed on the ceiling of the housing unit 82 as it accumulates above the roll body R1.

In the housing unit 82, the portion other than the opening 83 is preferably surrounded by walls. In addition, the opening 83 preferably has a size as small as possible as long as the fabric M pulled out from the roll body R1 having a maximum diameter and the fabric M pulled out from the roll body R1 having a minimum diameter can pass through the opening. Air can be smoothly changed due to the stable route on which air taken by the first air intake fan 48 from the outside of the housing unit 82 to the inside of the housing unit 82 is discharged from the inside of the housing unit 82 to the outside of the housing unit 82 by the first discharge fan 49.

The liquid ejector 11 includes a third detection unit 43 capable of detecting humidity inside the housing unit 82. For example, when the humidity inside the housing unit 82 is too high, the first moisture content detected by the first detection unit 41 may not be lowered even if the moisture applying unit 74 reduces the amount of moisture applied. In such a case, the control unit 90 can cause a third detection unit 43 to detect whether the humidity in the housing unit 82 is too high. If the humidity in the housing unit 82 is too high, the humidity in the housing unit 82 can be lowered by replacing the air inside the housing unit 82 with the first air intake fan 48 and the first discharge fan 49.

The liquid ejector 11 includes a moisture removing unit 85 that removes moisture from the roll body R1 held by the holding unit 19 in the housing unit 82. The moisture removing unit 85 includes a radiation plate 86 that radiates heat toward the roll body R1, a plurality of heating plates 87 affixed to the radiation plate 86, and a heating frame 88 that fixes the radiation plate 86 and the plurality of heating plates 87. The plurality of heating plates 87 are arranged in the circumferential direction of the roll body R1, for example. In the present embodiment, four heating plates 87*a*, 87*b*, 87*c*, and 87*d* are disposed.

For example, an aluminum plate member is used for the radiation plate 86, and is formed to be curved in one direction. The heating plates 87 are, for example, sheet-shaped heaters. The sheet-shaped heaters are configured such that heating elements such as metal foil are sandwiched inside sheet members such as a synthetic resin having flexibility, and thus heat is generated with a substantially uniform temperature distribution.

In order for the radiation plate 86 to radiate heat toward the roll body R1, the heating plates 87 heat the radiation plate 86 in a state in which the heating plates 87 are affixed to the outer surface of the radiation plate 86. The heating frame 88 fixes the radiation plate 86 with the inner surface of the radiation plate 86 to which each of the heating plates 87 are attached facing the roll body R1.

When power is supplied to the sheet-shaped heaters, the heating elements generate heat, and the heat is transmitted to the radiation plate 86 through the sheet members. The radiation plate 86 is warmed by the heat transmitted from the heating plates 87. The warmed radiation plate 86 radiates heat toward the opposing roll body R1. The roll body R1 is thereby heated.

In the present embodiment, the moisture removing unit 85 is configured to change the amount of heat emitted from the radiation plate 86 according to the number of the heating plate 87 being driven. When the amount of released heat increases, the amount of moisture evaporated from the roll body R1 increases, and when the amount of released heat decreases, the amount of moisture evaporated from the roll body R1 decreases. That is, the moisture removing unit 85 is configured to adjust the amount of moisture to be removed from the roll body R1.

The moisture removing unit 85 of the present embodiment is an example of a moisture removing unit. The moisture removing unit may be configured to be able to adjust the amount of moisture to be removed from the roll body R1. For example, as wind generated by the fan is blown onto the surface of the roll body R1, moisture may be evaporated from the surface of the roll body R1. In addition, the moisture removing unit may adjust the amount of moisture to be removed from the roll body R1 according to the air flow of the fan. Furthermore, for example, a sheet-shaped heater and a fan may be disposed together.

When heat released from the moisture removing unit 85 toward the roll body R1 reaches the surface of the roll body R1, it is primarily transmitted in the direction of the center of the roll body R1. As the fabric M1 has air permeability, the fabric M1 allows not only the heat released by the moisture removing unit 85 but also the air dried by the heat to pass therethrough. More specifically, when the dried air reaches the outer surface M1*a* of the fabric M1 of the first round, the heat is transmitted through the fabric M1 in the circumferential direction and the radial direction of the roll body R1. Along with that, dry air is passed through the voids in the weave of the fabric M toward the inner surface M1*b* in the thickness direction of the fabric M1, which is the radial direction of the roll body R1. In addition, since the dried air is brought in contact with the fabric M1 of the portion with a high moisture content, the dried air absorbs moisture from the fabric M1 in the portion of the fabric M1 where the dried air has passed.

When the amount of moisture to be removed by the moisture removing unit 85 increases, the distance in the fabric M1 through which the dried air has to pass increases. The dried air that has passed toward the inner surface M1*b* in the thickness direction of the fabric M1, which is the radial direction of the roll body R1, reaches the inner surface M1*b*, and at the same time reaches the outer surface M2*a* of the fabric M2 of the second round adhering to the inner surface M1*b*. Furthermore, when the amount of moisture to be removed by the moisture removing unit 85 further increases, the dried air continues to pass from the outer surface M2*a* of the fabric M2 of the second round toward the inner surface M2*b* in the thickness direction of the fabric M2 that is the radial direction of the roll body R1. Along with this, since the dried air is brought in contact with the fabric M2 of the portion with a high moisture content, the dried air absorbs moisture from the fabric M2 in the portion of the fabric M2 where the dried air has passed.

When the amount of moisture to be removed by the moisture removing unit 85 further increases, the dried air continuously passes through the inner side of the fabric M in the thickness direction. Along with this, since the dried air is brought in contact with the fabric M of the portion with a high moisture content, the dried air absorbs moisture from the fabric M in the portion further inside the fabric M where the dried air has passed. Since heat is released to the outer surface M1*a* of the roll body R1, the amount of moisture removed decreases from the outer surface M1*a* of the roll body R1 toward the inner fabric M away therefrom. However, when moisture is removed from the fabric M1 of the first round, some degree of moisture can be removed from the fabric M from the second round as well.

In the present embodiment, the first detection unit 41 is provided upstream of the moisture removing unit 85 in the direction of rotation of the roll body R1. The first moisture content detected by the first detection unit 41 is a moisture content of the fabric M1 from which moisture has been removed from the fabric M being in contact with the fabric M1. After the first detection unit 41 detects the first moisture content, the moisture removing unit 85 removes the moisture from the outer surface M1*a* of the fabric M1. Thus, it is possible to adjust the amount of moisture to be removed from the outer surface M1*a* of the fabric M1 of the first round in accordance with the moisture content of the fabric M1 from which moisture has been removed through the other fabric M being in contact with the fabric M1.

The second moisture content detected by the second detection unit 42 is a moisture content of the fabric M1 from which the moisture has been removed from the outer surface M1*a* of the fabric M1 by the moisture removing unit 85. The second detection unit 42 detects the second moisture content after the moisture is removed from the outer surface M1*a* of the fabric M1 by the moisture removing unit 85. Whether the amount of moisture removed by the moisture removing unit 85 is an appropriate amount can be verified based on the second moisture content detected by the second detection unit 42. Accordingly, an amount of moisture to be removed thereafter can be adjusted. That is, the amount of moisture to be removed from the outer surface M1*a* of the fabric M1 of the first round can be adjusted in accordance with the second moisture content of the printed surface Ma of the fabric M that has been pulled out from the roll body R1.

Figure 4:
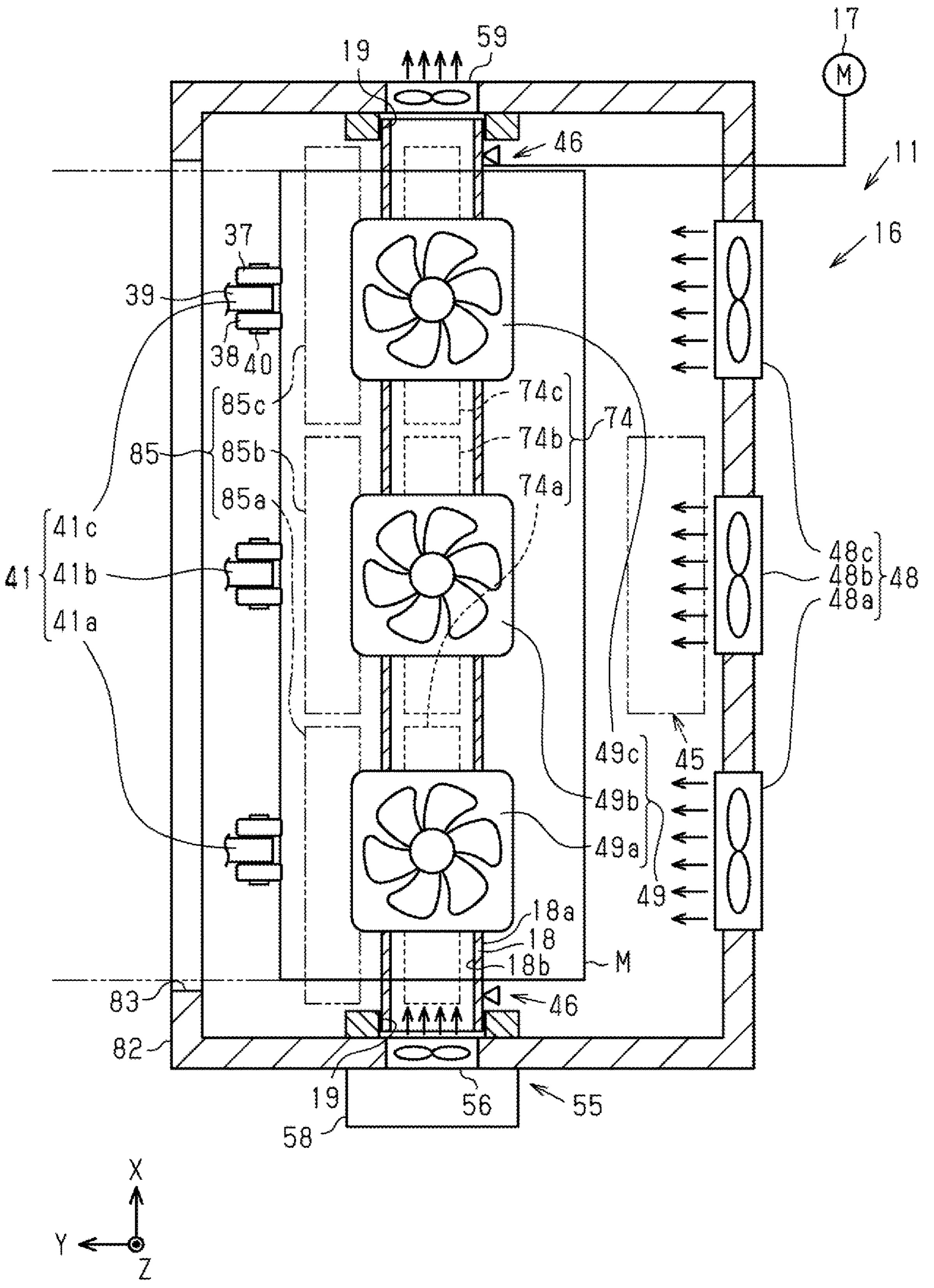
FIG. 4 is a schematic plan view illustrating the feeding unit of the first and second embodiments.

The liquid ejector 11 includes a cooling unit 55 that cools the shaft member 18 as illustrated in FIG. 4. In the present embodiment, the shaft member 18 has a cylindrical shape, and the inner space of the shaft member 18 communicates with the outside of the housing unit 82 through a second air intake fan 56 and a cooling mechanism 58 at one end of the shaft member. Furthermore, the inner space of the shaft member 18 communicates with the outside of the housing unit 82 via a second discharge fan 59 at the other end of the shaft member. The cooling mechanism 58 creates cold air with, for example, a heat exchange mechanism. In addition, the cold air is then taken into the inner space of the shaft member 18 by the second air intake fan 56. As a result, the inner space of the shaft member 18 is cooled, and the temperature of the inner surface 18*b* of the shaft member 18 is lowered. Then, the shaft member 18 is cooled, and the temperature of the outer surface 18*a* as a contact surface of the shaft member 18 in contact with the fabric M is lowered. The cold air fed into the inner space of the shaft member 18 and used to cool the shaft member 18 is discharged by the second discharge fan 59 to the outside of the housing unit 82.

The liquid ejector 11 includes a sixth detection unit 46 that detects the temperature of the outer surface 18*a* of the shaft member 18 as a contact surface in contact with the fabric M. The fabric M in contact with the outer surface 18*a* is the inner surface of the fabric M wound on the innermost side of the fabric M wound on the shaft member 18.

The shaft member 18 may be cooled. As in the present embodiment, the shaft member 18 may be cooled from the inside of the shaft member 18, and the shaft member 18 may be cooled from the outside of the shaft member 18 by cooling the air inside the housing unit 82. When the shaft member 18 is cooled from the outside of the shaft member 18, air cooled by the cooling mechanism 58 may be taken by the first air intake fan 48. In addition, instead of a detection unit that detects temperature of the shaft member 18, a detection unit that detects temperature around the roll body R1 in the housing unit 82 may also be provided.

The liquid ejector 11 may include a plurality of moisture applying units 74 that apply moisture to the roll body R1 in the housing unit 82 as illustrated in FIG. 4. The plurality of moisture applying units 74 are aligned in the width direction X along the rotational axis of the roll body R1. In the present embodiment, three moisture applying units 74*a*, 74*b*, and 74*c* are aligned in the width direction X. In addition, the three moisture applying units 74*a*, 74*b*, and 74*c* are configured to allow independent driving. As a result, the moisture applying units 74 are configured to be capable of adjusting a range in which moisture is applied in the width direction X along the rotational axis of the roll body R1. Further, the number of moisture applying units 74 aligned in the width direction X is not limited.

The liquid ejector 11 may include a plurality of moisture removing units 85 that remove moisture from the roll body R1 in the housing unit 82. The plurality of moisture removing units 85 are aligned in the width direction X. In the present embodiment, three moisture removing units 85*a*, 85*b*, and 85*c* are aligned in the width direction X. In addition, the three moisture removing units 85*a*, 85*b*, and 85*c* are configured to be able to be independently driven. Thus, the moisture removing units 85 are configured to be able to adjust a moisture-removable range in the width direction X. Further, the number of moisture removing units 85 aligned in the width direction X is not limited.

The liquid ejector 11 may include a plurality of first detection units 41 capable of detecting a first moisture content of a surface of the roll body R1. The plurality of first detection units 41 are aligned in the width direction X. In the present embodiment, three first detection units 41*a*, 41*b*, and 41*c* are aligned in the width direction X. In other words, the first detection unit 41*a* is configured to be able to detect the first moisture content on the −X direction side in the width direction X, the first detection unit 41*b* is configured to be able to detect the first moisture content of the center in the width direction X, and the first detection unit 41*c* is configured to be able to detect the first moisture content on the +X direction side in the width direction X. As a result, the first detection units 41 are configured to be able to detect a distribution of the first moisture contents in the width direction X. Further, the number of first detection units 41 aligned in the width direction X is not limited. However, each of the first detection units 41 is preferably disposed at a position corresponding to each of the moisture applying units 74 in the width direction X. Based on values of the first detection units 41, each of the moisture applying units 74 corresponding to the first detection units 41 can adjust the amount of moisture applied in which moisture is applied to the roll body R1 in the width direction X. However, each of the first detection units 41 is preferably disposed at a position corresponding to each of the moisture removing units 85 in the width direction X. Based on values of the first detection units 41, each of the moisture removing units 85 corresponding to the first detection units 41 can adjust the amount of moisture removed in which moisture is removed from the roll body R1 in the width direction X.

The liquid ejector 11 may include a plurality of second detection units 42 capable of detecting the second moisture content of the printed surface Ma of the fabric M that has been pulled out from the roll body R1. The plurality of second detection units 42 are aligned in the width direction X. In the present embodiment, three second detection units, which are not illustrated, are aligned in the width direction X. As a result, the second detection units 42 are configured to be able to detect a distribution of the second moisture contents in the width direction X. Further, the number of second detection units 42 aligned in the width direction X is not limited. However, each of the second detection units 42 is preferably disposed at a position corresponding to each of the moisture applying units 74 in the width direction X. Based on values of the second detection units 42, each of the moisture applying units 74 corresponding to the second detection units 42 can adjust the amount of moisture applied in which moisture is applied to the roll body R1 in the width direction X. In addition, each of the second detection units 42 is preferably disposed at a position corresponding to each of the moisture removing units 85 in the width direction X. Based on values of the second detection units 42, each of the moisture removing units 85 corresponding to the second detection units 42 can adjust the amount of moisture removed in which moisture is removed from the roll body R1 in the width direction X.

The liquid ejector 11 may include a plurality of first air intake fans 48 as an air intake portion for taking air into the housing unit 82 from the outside of the housing unit 82, and a plurality of first discharge fans 49 as a discharge portion for discharging air from the inside of the housing unit 82 to the outside of the housing unit 82. In the present embodiment, three first air intake fans 48*a*, 48*b*, and 48*c* are aligned in the width direction X, and three first discharge fans 49*a*, 49*b*, and 49*c* are aligned in the width direction X. This configuration allows air to be taken into the housing unit 82 from the outside of the housing unit 82 and to be discharged from the inside of the housing unit 82 to the outside of the housing unit 82 in the entire housing unit 82. Further, the numbers of the first air intake fans 48 and first discharge fans 49 aligned in the width direction X are not limited.

The liquid ejector 11 may include a plurality of third detection units 43 capable of detecting humidity inside the housing unit 82. The third detection units 43 can detect a variation in humidity due to locations inside the housing unit 82 by detecting humidity at multiple spots inside the housing unit 82. For example, even when humidity is too high at some locations inside the housing unit 82, the air inside the housing unit 82 can be replaced by the first air intake fans 48 and the first discharge fans 49. Further, the liquid ejector 11 may include a fan capable of stirring the air inside the housing unit 82. In addition, when humidity is too high at some locations inside the housing unit 82, the control unit 90 may cause the fan to stir the air inside the housing unit 82.

Regarding Control Unit

Figure 5:
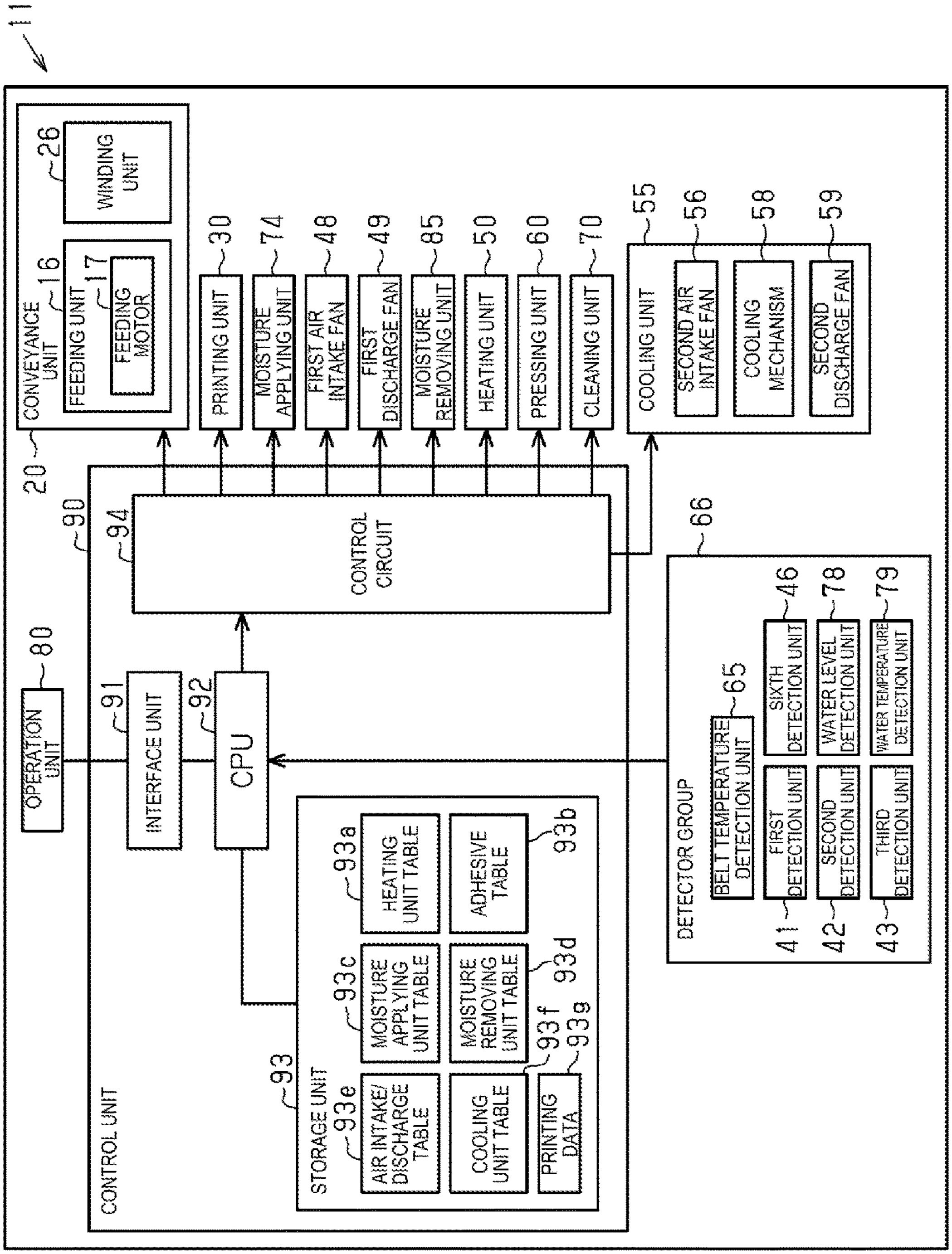
FIG. 5 is a block diagram illustrating a schematic configuration of the liquid ejector of the first embodiment.

The control unit 90 controls each unit of the liquid ejector 11 as illustrated in FIG. 5. An interface unit 91 enables the control unit 90 to transmit and receive data to and from an operation unit 80. A CPU 92 is an arithmetic processing unit for overall control of the liquid ejector 11. A storage unit 93 secures regions and work areas for storing programs of the CPU 92. The CPU 92 controls each unit of the liquid ejector 11 in compliance with the control circuit 94.

For example, the liquid ejector 11 has a moisture application mode, a moisture removal mode, and a mode in which neither moisture application nor moisture removal is performed. A user selects an operation mode through the operation unit 80.

The storage unit 93 stores a heating unit table 93*a*, an adhesive table 93*b*, a moisture applying unit table 93*c*, a moisture removing unit table 93*d*, an air intake/discharge table 93*e*, a cooling unit table 93*f*, and the like. Further, a detector group 66 monitors the status inside the liquid ejector 11, and the control unit 90 controls each unit of the liquid ejector 11 based on the detection result. The detector group 66 includes the belt temperature detection unit 65, the first detection unit 41, the second detection unit 42, the third detection unit 43, the sixth detection unit 46, the water level detection unit 78, the water temperature detection unit 79, and the like.

The storage unit 93 stores the heating unit table 93*a* in which a printing speed is associated with the quantity of the heating plates 52 to be driven corresponding to the printing speed. For example, when a user selects a printing mode with the operation unit 80, the control unit 90 reads, from the heating unit table 93*a*, the quantity of the heating plates 52 to be driven corresponding to the printing speed in the printing mode selected by the user. Then, after the heating plates 52 to be heated are selected, the control unit 90 drives the selected heating plates 52. Further, the heating unit table 93*a* may be a table in which a printing speed is associated with an output of the heating plates 52 corresponding to the printing speed.

The storage unit 93 stores the adhesive table 93*b* in which the type of adhesive is associated with the target temperature corresponding to the type of the adhesive. For example, when a user selects the type of adhesive to be used with the operation unit 80, the control unit 90 reads the target temperature corresponding to the adhesive from the adhesive table 93*b*. Then, the control unit 90 drives the heating plates 52 so that the temperature of the adhesive layer 25 reaches the target temperature.

The storage unit 93 stores the moisture applying unit table 93*c* in which an output value of the first detection unit 41 and an output value of the second detection unit 42 are associated with the target temperature of the water contained in the tank 75 of the moisture applying unit 74 corresponding to the output values. The first detection unit 41 detects the first moisture content, and the second detection unit 42 detects the second moisture content.

For example, the control unit 90 reads the target temperature of the water contained in the tank 75 from the moisture applying unit table 93*c* based on the detection result of the first detection unit 41 and the detection result of the second detection unit 42. Then, the control unit 90 adjusts the output of the heater 76 so that the output value of the water temperature detection unit 79 reaches the target temperature of the water contained in the tank 75. In this manner, the control unit 90 adjusts the amount of moisture to be applied to the roll body R1 by controlling the moisture applying unit 74 based on the detection result of the first detection unit 41 and the detection result of the second detection unit 42.

When the user selects the moisture application mode, the output value of the first detection unit 41 or the output value of the second detection unit 42 may be higher than a predetermined value. At this time, this status may be displayed on the display unit 81, and the operation mode of the liquid ejector 11 may automatically transition to a mode in which neither the moisture application nor moisture removal is performed. Further, the predetermined value mentioned here is a value at which the moisture content of the fabric M is determined to be sufficiently high and there is no need to apply moisture to the fabric M.

The moisture applying unit table 93*c* may associate at least one output value of the output value of the first detection unit 41 and the output value of the second detection unit 42 with the target temperature of the water contained in the tank 75 of the moisture applying unit 74 corresponding to the one output value.

The moisture applying unit table 93*c* may be configured such that the output of the heater 76 increases when the first moisture content tends to decrease, and the output of the heater 76 is reduced when the first moisture content tends to increase. In other words, the control unit 90 may control the moisture applying unit 74 so that the output of the heater 76 increases when the first moisture content tends to decrease and the output of the heater 76 is reduced when the first moisture content tends to increase based on the detection result of the first detection unit 41. In this manner, the control unit 90 may adjust the amount of moisture to be applied to the roll body R1 by controlling the moisture applying unit 74 based on the detection result of the first detection unit 41. In more detail, the control unit 90 may adjust the amount of moisture to be applied to the roll body R1 such that the moisture content converted from the output value of the first detection unit 41 does not deviate from the range of a predetermined moisture content.

In more detail, the control unit 90 adjusts the amount of moisture to be applied to the roll body R1 such that the moisture content converted from the output value of the first detection unit 41 does not deviate from the predetermined moisture content range. The predetermined moisture content range is a range of the moisture content of the fabric M that can prevent deterioration of the image quality for the type of the fabric M to be printed on. That is, the predetermined moisture content range is a range of the moisture content of the fabric M suitable for printing. The moisture content of the fabric M suitable for printing varies depending on the type of fabric M. The type of fabric M includes the type of material of the fabric M, the weaving method of the fabric M, the thickness of the fabric M, and the like. For those reasons, the predetermined moisture content range varies depending on the type of fabric M. For example, the predetermined moisture content range is determined by selecting the type of fabric M by the user using the operation unit 80.

The moisture applying unit table 93*c* may be configured such that the output of the heater 76 increases when the second moisture content tends to decrease, and the output of the heater 76 is reduced when the second moisture content tends to increase. In other words, the control unit 90 may control the moisture applying unit 74 so that the output of the heater 76 increases when the second moisture content tends to decrease and the output of the heater 76 is reduced when the second moisture content tends to increase based on the detection result of the second detection unit 42. In this manner, the control unit 90 may adjust the amount of moisture to be applied to the roll body R1 by controlling the moisture applying unit 74 based on the detection result of the second detection unit 42.

The control unit 90 may adjust the closing time of the discharge port 68 by the shutter 67. By adjusting the closing time of the shutter 67, the amount of vapor as an amount of moisture to be applied to the fabric M by the moisture applying unit 74 is adjusted. More specifically, the control unit 90 increases the output of the heater 76 when the output value of the water temperature detection unit 79 is lower than the target temperature, and never closes the shutter 67. Furthermore, when the output value of the water temperature detection unit 79 is higher than the target temperature, the control unit 90 may reduce the output of the heater 76, and the shutter 67 may be closed only for a predetermined period of time. It is possible to reduce the amount of vapor as the amount of moisture to be applied to the fabric M for a short period of time.

After the first detection unit 41 detects the first moisture content, the moisture applying unit 74 applies moisture to the outer surface M1*a* of the fabric M1. The second detection unit 42 detects the second moisture content after the moisture applying unit 74 applies moisture to the outer surface M1*a* of the fabric M1. That is, the control unit 90 can adjust the second moisture content that is the moisture content of the fabric M to be printed based on the detection result of the second detection unit 42 and the first detection unit 41.

The moisture applying unit table 93*c* may be configured such that the amount of moisture that the moisture applying unit 74 applies to the roll body R1 is reduced when the second moisture content is greater than the first moisture content and the difference between the second moisture content and the first moisture content is greater than a predetermined value. That is, the control unit 90 may reduce the amount of moisture to be applied to the roll body R1 when the second moisture content is greater than the first moisture content and the difference between the second moisture content and the first moisture content is greater than the predetermined value. The case in which the second moisture content is greater than the first moisture content and the difference between the second moisture content and the first moisture content is greater than the predetermined value is a case in which, for example, the amount of moisture to be applied to the roll body R1 has increased due to a change in humidity inside the housing unit 82 or the like.

The moisture applying unit table 93*c* may be configured such that the amount of moisture that the moisture applying unit 74 applies to the roll body R1 is increased when the second moisture content is greater than the first moisture content and the difference between the second moisture content and the first moisture content is smaller than the predetermined value. That is, the control unit 90 may increase the amount of moisture to be applied to the roll body R1 when the second moisture content is greater than the first moisture content and the difference between the second moisture content and the first moisture content is smaller than the predetermined value. The case in which the second moisture content is greater than the first moisture content and the difference between the second moisture content and the first moisture content is smaller than the predetermined value is a case in which, for example, the amount of moisture to be applied to the roll body R1 has been reduced due to a change in humidity inside the housing unit 82, or the like.

The moisture applying unit table 93*c* may be configured such that the amount of moisture that the moisture applying unit 74 applies to the roll body R1 is increased when the second moisture content is smaller than the first moisture content and the difference between the second moisture content and the first moisture content is greater than the predetermined value. That is, the control unit 90 may increase the amount of moisture to be applied to the roll body R1 when the second moisture content is smaller than the first moisture content and the difference between the second moisture content and the first moisture content is greater than the predetermined value. The case in which the second moisture content is smaller than the first moisture content and the difference between the second moisture content and the first moisture content is greater than the predetermined value is, for example, a case in which a large amount of moisture evaporates from the fabric M pulled out from the roll body R1 for a short period of time because the humidity outside the housing unit 82 is low.

The storage unit 93 stores the air intake/discharge table 93*e* in which an output value of the third detection unit 43 is associated with a rotational speed of the first air intake fan 48 and the first discharge fan 49. In the present embodiment, the rotational speed of the first air intake fan 48 is equal to the rotational speed of the first discharge fan 49 when the first air intake fan 48 and the first discharge fan 49 rotate. Further, the output value of the third detection unit 43 indicates humidity inside the housing unit 82.

For example, the control unit 90 reads the rotational speed of the first air intake fan 48 and the first discharge fan 49 from the air intake/discharge table 93*e* based on the detection result of the third detection unit 43. In addition, the control unit 90 rotates the first air intake fan 48 and the first discharge fan 49 so that the first air intake fan 48 and the first discharge fan 49 have the rotational speed. For example, when the output value of the third detection unit 43 exceeds a first value, the first air intake fan 48 and the first discharge fan 49 rotate. When the output value of the third detection unit 43 exceeds a second value that is greater than the first value, the rotational speed further increases. When the output value of the third detection unit 43 falls below the second value, the rotational speed decreases. When the output value of the third detection unit 43 falls below the first value, the first air intake fan 48 and the first discharge fan 49 stop. By adjusting the rotational speed of the first air intake fan 48 and the first discharge fan 49, it is possible to prevent humidity inside the housing unit 82 from continuously increasing.

At least one of the first air intake fan 48 and the first discharge fan 49 may be able to adjust the volume of flowing air. In addition, the amount of air taken by the first air intake fan 48 and the amount of air discharged by the first discharge fan 49 may not be equal. The difference between the amount of air taken by the first air intake fan 48 and the amount of air discharged by the first discharge fan 49 is adjusted with the air going in and out from the gap of the opening 83, and thus the volume of air flowing in the housing unit 82 can be adjusted. Furthermore, either the first air intake fan 48 or the first discharge fan 49 may not be provided. In addition, an air intake port may be provided instead of the first air intake fan 48, or a discharge port may be provided instead of the first discharge fan 49. The volume of air flowing in the housing unit 82 can be adjusted by either fan of the first air intake fan 48 and the first discharge fan 49. That is, the control unit 90 may adjust the volume of air flowing by controlling at least one of the intake portion and the discharge portion based on the detection result of the third detection unit 43.

The storage unit 93 may store the cooling unit table 93*f* in which the humidity inside the housing unit 82 that is the output value of the third detection unit 43 is associated with the target temperature of the outer surface 18*a* corresponding to the output value. The target temperature of the outer surface 18*a* is the target temperature of the outer surface 18*a* of the shaft member 18 cooled with cold air by the cooling mechanism 58 that is as a contact surface in contact with the fabric M, and is a temperature equal to or lower than the dew point temperature of vapor inside the housing unit 82. That is, the target temperature of the outer surface 18*a* is a temperature equal to or lower than the temperature at which the relative humidity inside the housing unit 82 is 100%. For example, the control unit 90 reads the target temperature of the outer surface 18*a* from the cooling unit table 93*f* based on the detection result of the third detection unit 43. In addition, the control unit 90 adjusts the output of the cooling mechanism 58 so that the output value of the sixth detection unit 46 reaches the target temperature of the outer surface 18*a*. Further, the output value of the sixth detection unit 46 is the temperature of the outer surface 18*a* of the shaft member 18 in contact with the fabric M. In addition, the control unit 90 controls the cooling unit 55 such that the temperature of the outer surface 18*a* detected by the sixth detection unit 46 is lower than or equal to the dew point temperature of vapor inside the housing unit 82 based on the detection result of the third detection unit 43.

The relationship between humidity and the dew point temperature inside the housing unit 82 will be described in detail. Humidity inside the housing unit 82 is relative humidity inside the housing unit 82. Relative humidity is a value indicating what percentage of moisture is contained in the air at a certain temperature with respect to the amount of saturated water vapor in the air at the temperature. For example, when air at a certain temperature contains an amount of moisture that is half the amount of saturated water vapor, the relative humidity is 50%. Relative humidity is generally used to indicate humidity. That is, with temperature and relative humidity, the amount of water vapor in the air can be calculated, and the dew point temperature, which is a temperature at which the relative humidity is 100%, can be calculated with the amount of water vapor. In addition, the control unit 90 adjusts the output of the cooling mechanism 58 such that the temperature of the outer surface 18*a* of the shaft member 18 as a contact surface in contact with the fabric M is lower than or equal to the dew point temperature. Since the amount of saturated water vapor decreases as the temperature of the outer surface 18*a* decreases, when temperature is lower than or equal to the dew point temperature, the amount of moisture that is no longer contained in the air increases as the temperature of the outer surface 18*a* decreases. That is, when temperature is lower than or equal to the dew point temperature, more moisture condenses on the surface of the fabric M as the temperature of the outer surface 18*a* becomes lower.

It is desirable for the third detection unit 43 to output temperature and humidity inside the housing unit 82. As a result, the dew point temperature can be calculated only with the output value of the third detection unit 43. Further, a user may input the value of the thermometer in the room using the operation unit 80, or the liquid ejector 11 may communicate with an external device to acquire the room temperature from the external device. Since the temperature inside the housing unit 82 is a value close to the room temperature, the temperature inside the housing unit 82 may be replaced with the room temperature to calculate the dew point temperature.

The third detection unit 43 may output absolute humidity inside the housing unit 82. Absolute humidity is a value indicating the mass of moisture contained in air at a constant air volume. In this case, information of the temperature inside the housing unit 82 may not be provided. Since absolute humidity is the amount of water vapor in the air, it is possible to calculate the dew point temperature, which is the temperature at which the relative humidity to the amount of water vapor is 100%, only with absolute humidity. In addition, the output of the cooling mechanism 58 can be adjusted such that the temperature of the outer surface 18*a* of the shaft member 18 as a contact surface in contact with the fabric M is lower than or equal to the dew point temperature.

The output of the cooling mechanism 58 is adjusted according to the target temperature of the outer surface 18*a*. By adjusting the output of the cooling mechanism 58 of the cooling unit 55, the fabric M is cooled due to the outer surface 18*a* of the shaft member 18 as a contact surface in contact with the fabric M. Furthermore, the amount of moisture generated when water condensation occurs in a portion of the cooled fabric M in contact with the surrounding air is adjusted based on the output of the cooling mechanism 58. With this configuration, the amount of moisture applied to the fabric M from the surrounding air is adjusted.

The cooling unit table 93*f* may have the output value of the first detection unit 41 associated with the target temperature of the outer surface 18*a*. In more detail, the cooling unit table 93*f* may be configured such that the target temperature of the outer surface 18*a* becomes lower when the first moisture content tends to decrease, and the target temperature of the outer surface 18*a* becomes higher when the first moisture content tends to increase based on the detection result of the first detection unit 41. With this configuration, the amount of moisture that condenses on the surface of the fabric M can be adjusted according to the moisture content of the fabric M.

The storage unit 93 includes the moisture removing unit table 93*d* in which the output value of the first detection unit 41 and the output value of the second detection unit 42 are associated with the quantity of the heating plates 87 to be driven by the moisture removing unit 85 corresponding to the output values. For example, the control unit 90 reads the quantity of the heating plates 87 to be driven from the moisture removing unit table 93*d* based on the detection result of the first detection unit 41 and the detection result of the second detection unit 42. Then, after the heating plates 87 to be heated are selected, the control unit 90 drives the selected heating plates 87. The amount of moisture to be removed by the moisture removing unit 85 from the fabric M is adjusted by driving the selected heating plates 87.

The amount of moisture to be removed by the moisture removing unit 85 from the fabric M is adjusted by adjusting the quantity of the heating plates 87 to be driven. More specifically, when the quantity of the heating plates 87 to be driven increases, the amount of heat emitted from the radiation plate 86 is increased, and when the quantity of the heating plates 87 to be driven is reduced, the amount of heat emitted from the radiation plate 86 is reduced. That is, if the quantity of the heating plates 87 to be driven is increased, the amount of moisture removed by the moisture removing unit 85 from the fabric M increases, and when the quantity of the heating plates 87 to be driven is reduced, the amount of moisture removed by the moisture removing unit 85 from the fabric M is reduced.

When the user selects a moisture removal mode, the output value of the first detection unit 41 or the output value of the second detection unit 42 may be lower than a predetermined value. At this time, this status may be displayed on the display unit 81, and the operation mode of the liquid ejector 11 may automatically transition to the mode in which neither moisture application nor moisture removal is performed. Further, the predetermined value mentioned here is a value at which the moisture content of the fabric M is determined to be sufficiently low and there is no need to remove moisture from the fabric M. An optimum value is set in advance for the predetermined value through an experiment, a simulation, or the like.

The moisture removing unit table 93*d* may be configured such that the quantity of the heating plates 87 to be driven is increased when the first moisture content tends to increase, and the quantity of the heating plates 87 to be driven is reduced when the first moisture content tends to decrease. That is, the control unit 90 may control the moisture removing unit 85 such that the quantity of the heating plates 87 to be driven is increased when the first moisture content tends to increase, and the quantity of the heating plates 87 to be driven is reduced when the first moisture content tends to decrease based on the detection result of the first detection unit 41. In this way, the control unit 90 may adjust the amount of moisture to be removed from the roll body R1. In more detail, the control unit 90 may adjust the amount of moisture to be removed from the roll body R1 such that the moisture content converted from the output value of the first detection unit 41 does not deviate from the range of a predetermined moisture content.

The moisture removing unit table 93*d* may be configured such that the output of the heater 76 increases when the second moisture content tends to increase, and the output of the heater 76 is reduced when the second moisture content tends to decrease. That is, the control unit 90 may control the moisture removing unit 85 such that the quantity of the heating plates 87 to be driven is increased when the second moisture content tends to increase, and the quantity of the heating plates 87 to be driven is reduced when the second moisture content tends to decrease based on the detection result of the second detection unit 42. In this way, the control unit 90 may adjust the amount of moisture to be removed from the roll body R1 based on the detection result of the second detection unit 42.

The moisture removing unit table 93*d* may be configured such that the amount of moisture to be removed from the roll body R1 by the moisture removing unit 85 is increased when the second moisture content is smaller than the first moisture content and the difference between the second moisture content and the first moisture content is less than the predetermined value. In other words, the control unit 90 may control the moisture removing unit 85 so that the amount of the heating plate 87 to be driven is large when the second moisture content is less than the first moisture content and the difference between the second moisture content and the first moisture content is below the predetermined value, based on the moisture removing unit table 93*d*. The case in which the second moisture content is smaller than the first moisture content and the difference between the second moisture content and the first moisture content is smaller than the predetermined value is a case in which, for example, the amount of moisture to be removed from the roll body R1 has been reduced due to a change in humidity inside the housing unit 82, or the like.

The moisture removing unit table 93*d* may be configured such that the amount of moisture to be removed from the roll body R1 by the moisture removing unit 85 is reduced when the second moisture content is smaller than the first moisture content and the difference between the second moisture content and the first moisture content is greater than the predetermined value. In other words, the control unit 90 may control the moisture removing unit 85 such that the quantity of the heating plates 87 to be driven decreases when the second moisture content is less than the first moisture content, the difference between the second moisture content and the first moisture content is greater than the predetermined value based on the moisture removing unit table 93*d*. The case in which the second moisture content is less than the first moisture content and the difference between the second moisture content and the first moisture content is greater than the predetermined value is a case in which, for example, the amount of moisture to be removed from the roll body R1 has increased due to a change in humidity inside the housing unit 82 or the like.

The moisture removing unit table 93*d* may be configured such that the amount of moisture to be removed from the roll body R1 by the moisture removing unit 85 is increased when the second moisture content is smaller than the first moisture content and the difference between the second moisture content and the first moisture content is greater than the predetermined value. That is, the control unit 90 may increase the amount of moisture to be removed from the roll body R1 when the second moisture content is greater than the first moisture content and the difference between the second moisture content and the first moisture content is greater than the predetermined value based on the moisture removing unit table 93*d*. The case in which the second moisture content is greater than the first moisture content and the difference between the second moisture content and the first moisture content is greater than the predetermined value is, for example, a case in which the fabric M pulled out from the roll body R1 absorbs a large amount of moisture from the ambient air for a short period of time because the humidity outside the housing unit 82 is high. In this way, the control unit 90 may adjust the amount of moisture to be removed from the roll body R1.

When the moisture applying unit 74 is driven, the control unit 90 may adjust the range in which moisture is applied to the roll body R1 by the moisture applying unit 74 in the width direction X in accordance with the range in which the ejection unit 31 ejects a liquid to the fabric M in the width direction X. The storage unit 93 stores printing data 93*g* for the ejection unit 31 to perform printing on the fabric M. With reference to the printing data 93*g*, a range in which liquid is ejected to the fabric M can be detected. For example, when the range in which liquid is ejected to the fabric M is only the center in the width direction X, the control unit 90 may drive only the moisture applying unit 74*b* that applies moisture to the center of the fabric M in the width direction X. Moisture can be applied to only the center of the fabric M in the width direction X.

When the moisture applying unit 74 is driven, the control unit 90 may adjust the amount of moisture to be applied to the roll body R1 by the moisture applying unit 74 in the width direction X in accordance with the range in which the ejection unit 31 ejects a liquid to the fabric M in the width direction X. For example, when the range in which liquid is ejected to the fabric M is only the center in the width direction X, the control unit 90 may set the output of the heater 76 of the moisture applying unit 74*b* at the center of the fabric M in the width direction X to be greater than the output of the other moisture applying units 74*a* and 74*c*. More moisture can be applied to the center of the fabric M in the width direction X than to the end thereof.

When the moisture removing unit 85 is driven, the control unit 90 may adjust the range in which moisture is removed from the roll body R1 by the moisture removing unit 85 in the width direction X in accordance with the range in which the ejection unit 31 ejects a liquid to the fabric M in the width direction X. For example, when the range in which the liquid is discharged to the fabric M is only the center in the width direction X, the control unit 90 may cause only the moisture removing unit 85*b* that removes moisture from the center to drive. Moisture can be removed only from the center of the fabric M in the width direction X.

When the moisture removing unit 85 is driven, the control unit 90 may adjust the amount of moisture to be removed from the roll body R1 by the moisture removing unit 85 in the width direction X in accordance with the range in which the ejection unit 31 ejects a liquid to the fabric M in the width direction X. For example, when the range in which the liquid is ejected to the fabric M is only the center, the control unit 90 may set the quantity of the heating plates 87 to be driven by the moisture removing unit 85*b* at the center to be greater than the quantity of the heating plates 87 to be driven by the other moisture removing units 85*a* and 85*c*. More moisture can be removed from the center of fabric M than from the end of fabric M.

Regarding Flow of Adjusting Amount of Moisture to be Applied

Figure 6:
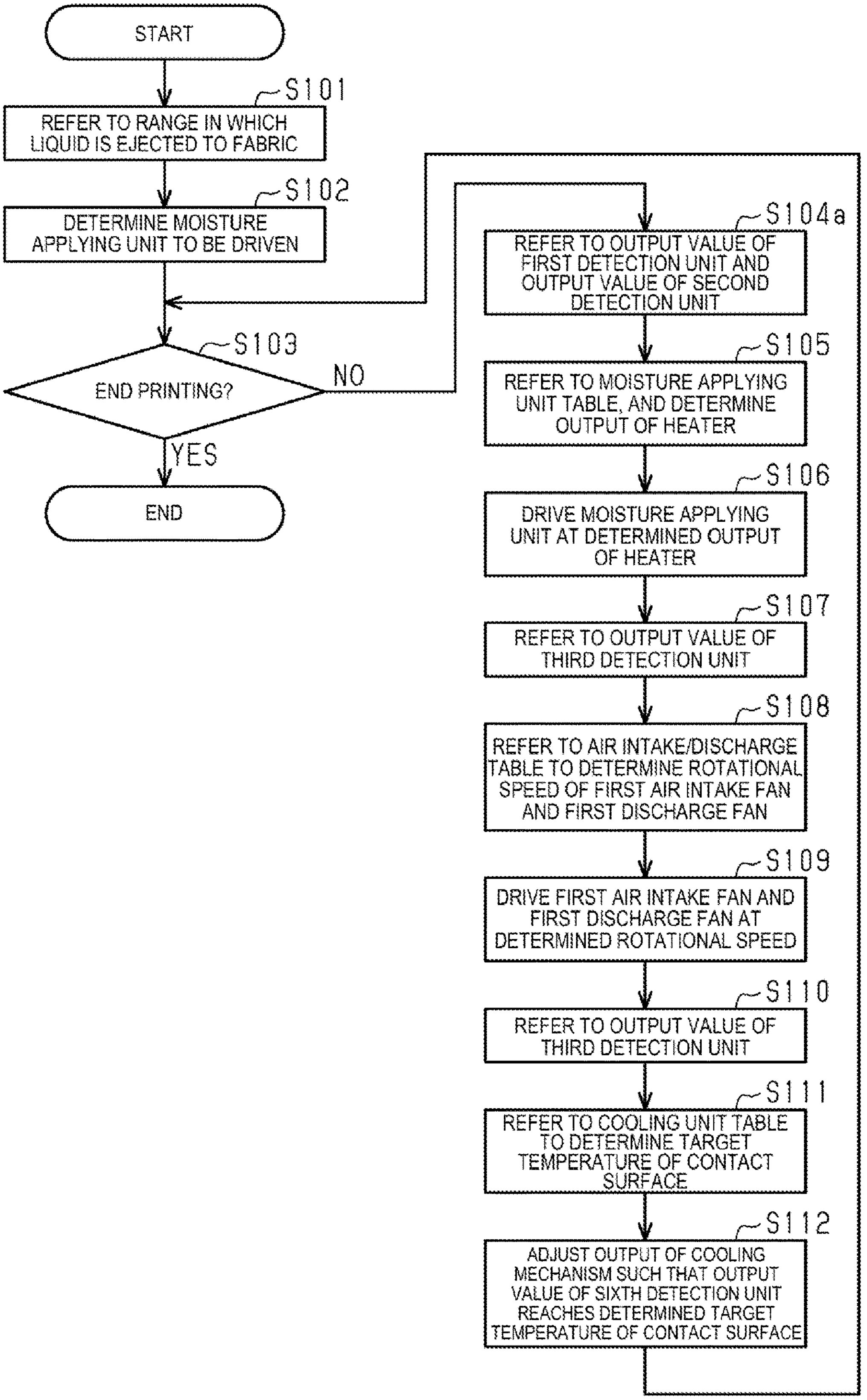
FIG. 6 is a flowchart of a control unit of the first embodiment when the control unit adjusts a moisture application amount.

When the operation mode of the liquid ejector 11 is a moisture application mode, the control unit 90 adjusts the amount of moisture to be applied to the roll body R1 by controlling the moisture applying unit 74 as illustrated in FIG. 6. Control executed by the control unit 90 in each step indicated by the flowchart when the operation mode of the liquid ejector 11 is the moisture application mode will be described in order. Further, this flow is an example of control executed by the control unit 90.

In step S101, the control unit 90 refers to the printing data 93*g* for the range in which a liquid is ejected to the fabric M. Then, in step S102, the control unit 90 determines whether to drive each of the moisture applying units 74*a*, 74*b*, and 74*c* based on the printing data 93*g*. That is, the control unit 90 adjusts the range in which moisture is applied to the roll body R1 by the moisture applying unit 74 in the width direction X in accordance with the range in which the ejection unit 31 ejects the liquid to the fabric M in the width direction X.

In step S103, the control unit 90 determines whether to end the printing. If the printing is to be ended, the answer to step S103 is YES, and the control unit 90 ends the flow. If the printing is not to be ended, the answer to step S103 is NO, and the control unit 90 shifts the process to step S104*a*.

In step S104*a*, the control unit 90 refers to the output value of the first detection unit 41 and the output value of the second detection unit 42. Then, in step S105, the control unit 90 refers to the moisture applying unit table 93*c* to determine output of the heater 76. Then, the control unit 90 drives the moisture applying unit 74 at the determined output of the heater 76 in step S106. In this manner, the control unit 90 adjusts the amount of moisture to be applied to the roll body R1 by controlling the moisture applying unit 74 based on the detection result of at least one of the first detection unit 41 and the second detection unit 42. Then, the control unit 90 shifts the process to step S107.

In step S107, the control unit 90 refers to the output value of the third detection unit 43. Then, in step S108, the control unit 90 refers to the air intake/discharge table 93*e* to determine the rotational speed of the first air intake fan 48 and the rotational speed of the first discharge fan 49. Then, in step S109, the control unit 90 drives the first air intake fan 48 at the determined rotational speed of the first air intake fan 48 and the first discharge fan 49 at the determined rotational speed of the first discharge fan 49. In this manner, the control unit 90 may adjust the volume of air flowing outside the housing unit 82 and inside the housing unit 82 by controlling at least one of the first air intake fan 48 and the first discharge fan 49 based on the detection result of the third detection unit 43. Then, the control unit 90 shifts the process to step S110.

In step S110, the control unit 90 refers to the output value of the third detection unit 43 again. Then, in step S111, the control unit 90 refers to the cooling unit table 93*f* to determine the target temperature of the outer surface 18*a* as a contact surface of the shaft member 18 in contact with the fabric M. Then, in step S112, the control unit 90 adjusts the output of the cooling mechanism 58 of the cooling unit 55 such that the output value of the sixth detection unit 46 reaches the determined target temperature of the outer surface 18*a*. In this manner, the control unit 90 controls the cooling unit 55 such that the temperature detected by the sixth detection unit 46 is lower than or equal to the dew point temperature of vapor inside the housing unit 82 based on the detection result of the third detection unit 43. Then, the control unit 90 shifts the process to step S103. Then, the control unit 90 repeats from step S103 to step S112 until the printing is ended.

Regarding Flow of Adjusting Amount of Moisture to be Removed

Figure 7:
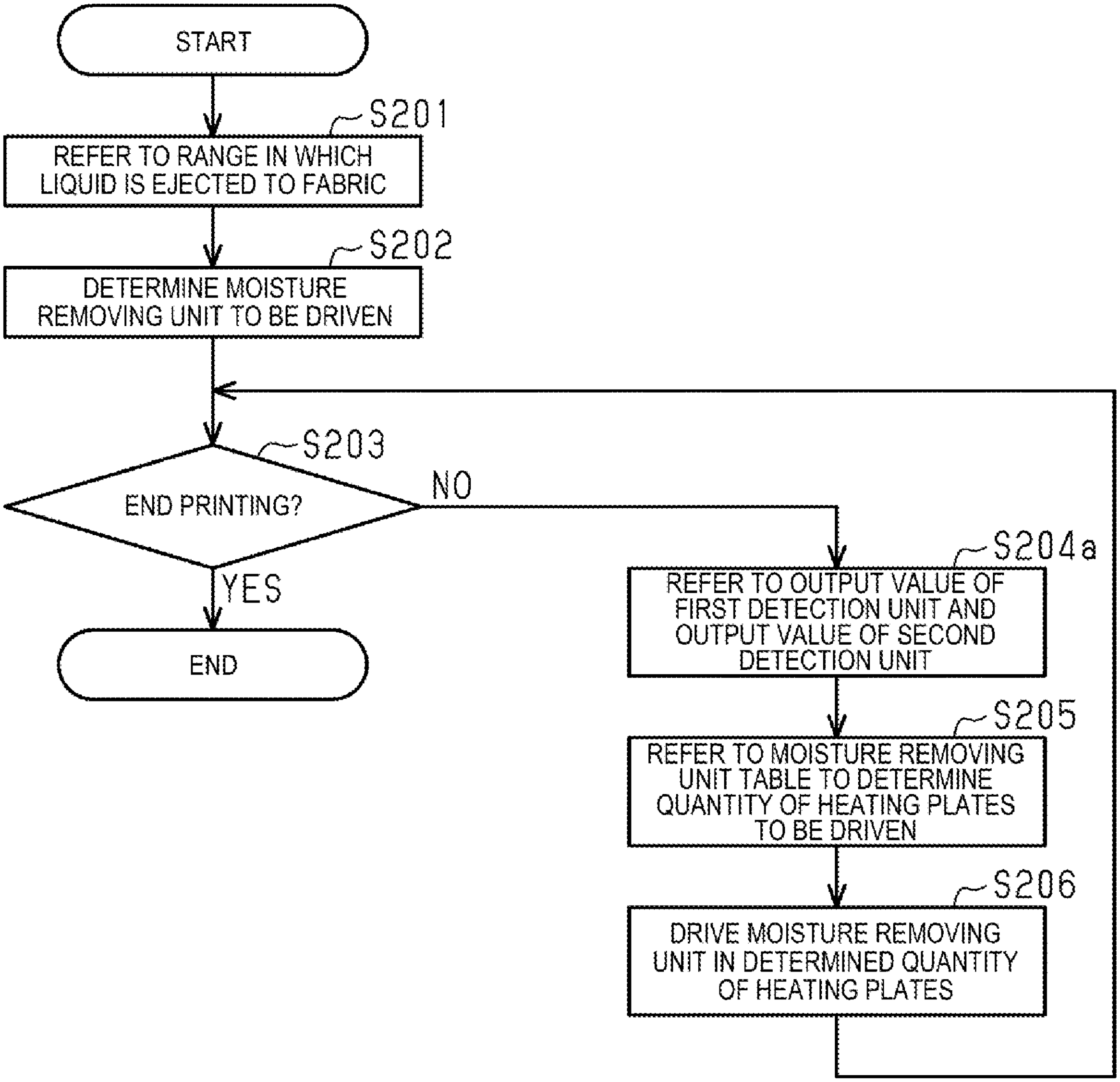
FIG. 7 is a flowchart of the control unit of the first embodiment when the control unit adjusts an amount of moisture to be removed.

When the operation mode of the liquid ejector 11 is a moisture removal mode, the control unit 90 adjusts the amount of moisture to be removed from the roll body R1 by controlling the moisture removing unit 85 as illustrated in FIG. 7. Control executed by the control unit 90 in each step indicated by the flowchart when the operation mode of the liquid ejector 11 is the moisture removal mode will be described in order. Further, this flow is an example of control executed by the control unit 90.

In step S201, the control unit 90 refers to the printing data 93*g* for the range in which a liquid is ejected to the fabric M. Then, in step S202, the control unit 90 determines whether to drive each of the moisture removing units 85*a*, 85*b*, and 85*c* based on the printing data 93*g*. That is, the control unit 90 adjusts the range in which moisture is removed from the roll body R1 by the moisture removing units 85 in the width direction X in accordance with the range in which the ejection unit 31 ejects the liquid to the fabric M in the width direction X.

In step S203, the control unit 90 determines whether to end the printing. If the printing is to be ended, the answer to step S203 is YES, and the control unit 90 ends the flow. If the printing is not to be ended, the answer to step S203 is NO, and the control unit 90 shifts the process to step S204*a*.

In step S204*a*, the control unit 90 refers to the output value of the first detection unit 41 and the output value of the second detection unit 42. Then, in step S205, the control unit 90 refers to the moisture removing unit table 93*d* to determine the quantity of the heating plates 87 to be driven. Then, in step S206, the control unit 90 drives the moisture removing unit 85 with the determined quantity of the heating plates 87. In this manner, the control unit 90 adjusts the amount of moisture to be removed from the roll body R1 by controlling the moisture removing units 85 based on the detection result of at least one of the first detection unit 41 and the second detection unit 42. Then, the control unit 90 shifts the process to step S203. Then, the control unit 90 repeats from step S203 to step S206 until the printing is ended.

Actions of Embodiment

Actions of the embodiment will be described.

The user desirably causes the roll body R1 to be held in the holding unit 19 after the moisture content of the fabric M in the roll body R1 around which the fabric M is wound is measured. Then, the user desirably selects the operation mode of the liquid ejector 11 in accordance with the measurement result of the moisture content through the operation unit 80. The user selects the moisture application mode when the moisture content of the fabric M is lower than a predetermined value. The user may select the moisture application mode when the moisture content of the fabric M is expected to be lower than the predetermined value, depending on the environment of the storage location of the fabric M, or the like, for example. Further, the predetermined value mentioned here is a value at which the image quality of the fabric M may be affected by a low moisture content of the fabric M.

The control unit 90 starts control of the operation of each unit of the liquid ejector 11. Further, before printing is started, it is desirable that the moisture applying unit 74 applies moisture to the roll body R1 before the fabric M is pulled out from the roll body R1 while the first detection unit 41 detects the first moisture content. Then, it is desirable that the fabric M is pulled out from the roll body R1 and printing is started after the first moisture content reaches a predetermined value. Further, the predetermined value mentioned here is a value at which the image quality of the fabric M may be affected by a high moisture content of the fabric M.

The fabric M is pulled out from the roll body R1. The second detection unit 42 detects the second moisture content of the printed surface Ma in the fabric M after being pulled out from the roll body R1. The moisture applying unit 74 applies moisture from the outer surface M1*a* of the fabric M1 of the first round. Since the fabric M has air permeability, moisture passes through the fabric M even in the water vapor state. Therefore, when moisture is applied to the fabric M1 of the first round, wet air passes through the voids in the weave of the fabric M, moisture from water of the liquid permeates the fabric M, and thus some amount of moisture can also be applied to the fabric M from the second and succeeding rounds.

It is desirable for the moisture applying unit 74 to measure in advance data of the relationship between the amount of moisture to be applied to the fabric M1 of the first round and the change in the moisture content of the fabric M1 of the first round according to the type of fabric M to be printed on, for example, Thus, the range of the amount of moisture to be applied in which the moisture content of the fabric M to be printed on does not deviate from the range of a predetermined moisture content can be predicted. Furthermore, it is desirable to configure the moisture applying unit table 93*c* based on the data. An amount of moisture to be applied may not be an amount of moisture actually applied to the fabric M. An amount of moisture to be applied may be a parameter at which the amount of moisture to be applied can be adjusted. In the present embodiment, a parameter at which the amount of moisture to be applied can be adjusted is, for example, a temperature of the water contained in the tank 75. Therefore, for example, data of the relationship between a temperature of the water contained in the tank 75 when moisture is applied to the fabric M1 of the first round and a change in a moisture content of the fabric M1 of the first round may be measured in advance.

The difference between an output value of a detection result of the first detection unit 41 and an output value of a detection result of the second detection unit 42 corresponds to an amount of moisture to be applied when moisture is applied to the fabric M1 of the first round. That is, the control unit 90 can adjust the amount of moisture to be applied to the roll body R1 by controlling the moisture applying unit 74 based on the detection result of the first detection unit 41 and the detection result of the second detection unit 42, thereby being able to adjust the moisture content of the fabric M.

In this way, it is possible to curb deterioration in the image quality by the moisture applying unit 74 adjusting the moisture content of the fabric M not to deviate from the predetermined moisture content range according to the type of fabric M to be printed on.

The third detection unit 43 detects humidity inside the housing unit 82. The control unit 90 adjusts the volume of air flowing inside the housing unit 82 and outside the housing unit 82 based on the detection result of the third detection unit 43. This makes it possible to suppress too much moisture applied to the fabric M due to the increase in humidity in the housing unit 82.

For example, it is desirable to measure in advance data of the relationship between the humidity inside the housing unit 82 in which the roll body R1 is housed and the moisture content of the fabric M when it is left at the humidity for a long period of time according to the type of fabric M to be printed on. This makes it possible to predict whether the humidity inside the housing unit 82 has risen too high. Furthermore, it is desirable to configure the air intake/discharge table 93*e* based on the data.

The first air intake fan 48 and the first discharge fan 49 are disposed such that air taken in the housing unit 82 by the first air intake fan 48 passes through the surroundings of the roll body R1 when the air is discharged from the inside the housing unit 82 by the first discharge fan 49. Thus, air in the surroundings of the roll body R1 can be replaced.

The sixth detection unit 46 detects the temperature of the outer surface 18*a*, which is a contact surface of the shaft member 18 in contact with the fabric M. The control unit 90 controls the cooling unit 55 such that the temperature detected by the sixth detection unit 46 is lower than or equal to the dew point temperature of vapor inside the housing unit 82 based on the detection result of the third detection unit 43. When the temperature of the air inside the housing unit 82 is lower than or equal to the dew point temperature, the portion of the fabric M in contact with the air inside the housing unit 82 has water condensation. That is, moisture from water of the liquid is generated in the portion with water condensation. Furthermore, since the moisture is absorbed by the fabric M, the absorption rate of moisture can be increased than that of the fabric M absorbing moisture as water vapor from the air. That is, the amount of moisture to be applied to the roll body R1 can be increased more than when only the moisture applying unit 74 applies moisture to the roll body R1.

It is desirable to measure in advance data of the relationship between the temperature of the outer surface 18*a* of the shaft member 18 that is a contact surface in contact with the fabric M, the amount of moisture in the air, and the change in the moisture content of the fabric M according to the type of fabric M to be printed on, for example. As a result, it is possible to predict the range of the temperature of the outer surface 18*a* in which the moisture content of the fabric M to be printed on does not deviate from the range of a predetermined moisture content based on the cooling unit table 93*f* by supplementing moisture to be applied by the moisture applying unit 74. Furthermore, it is desirable to configure the cooling unit table 93*f* based on the data.

The liquid ejector 11 includes a plurality of moisture applying units 74 in the width direction X along the rotational axis of the roll body R1, and thus the control unit 90 can adjust the range in which moisture is applied in the width direction X along the rotational axis of the roll body R1.

The user selects the moisture removal mode when the moisture content of the fabric M is higher than a predetermined value. Since the fabric M has air permeability, heat discharged by the moisture removing unit 85 is transmitted and dry air also passes through the fabric M. Thus, when moisture is removed from the fabric M1 of the first round, dry air passes through the voids in the weave of the fabric M, heat is transmitted through the fabric M, and thus some amount of moisture can also be removed from the fabric M of the second and succeeding rounds. Further, the predetermined value mentioned here is a value at which the image quality of the fabric M may be affected by a high moisture content of the fabric M.

It is desirable for the moisture removing unit 85 to measure in advance data of the relationship between the amount of moisture to be removed from the fabric M1 of the first round and the change in the moisture content of the fabric M1 of the first round according to the type of fabric M to be printed on, for example. Thus, the range of the amount of moisture to be removed in which the moisture content of the fabric M to be printed on does not deviate from the range of a predetermined moisture content can be predicted. For this reason, it is desirable to configure the moisture removing unit table 93*d* based on the data. An amount of moisture to be removed may not be an amount of moisture to be actually removed from the fabric M. An amount of moisture to be removed may be a parameter at which the amount of moisture to be removed can be adjusted. In the present embodiment, a parameter at which the amount of moisture to be removed can be adjusted is, for example, the quantity of the heating plates 87 to be driven. Thus, for example, data of the relationship between the quantity of the heating plates 87 to be driven when moisture is removed from the fabric M1 of the first round and a change in a moisture content of the fabric M1 of the first round may be measured in advance.

The difference between an output value of a detection result of the first detection unit 41 and an output value of a detection result of the second detection unit 42 corresponds to an amount of moisture to be applied when moisture is removed from the fabric M1 of the first round. That is, the control unit 90 can adjust the amount of moisture to be removed from the roll body R1 by controlling the moisture removing unit 85 based on the detection result of the first detection unit 41 and the detection result of the second detection unit 42, thereby being able to adjust the moisture content of the fabric M.

In this way, it is possible to curb deterioration in the image quality by the moisture removing unit 85 adjusting the moisture content of the fabric M not to deviate from the predetermined moisture content range according to the type of fabric M to be printed on.

Effects of Embodiment

Effects exhibited by the present embodiment will now be described.

The liquid ejector 11 of the present embodiment brings about the following effects.

(1) The liquid ejector 11 includes the holding unit 19 capable of holding the roll body R1 around which the fabric M is wound, and the conveyance unit 20 capable of pulling the fabric M out from the roll body R1 to convey the fabric M.

Furthermore, the liquid ejector 11 includes the ejection unit 31 capable of ejecting a liquid to the fabric M pulled out from the roll body R1, and the moisture applying unit 74 that applies moisture to the roll body R1 held by the holding unit 19. When the moisture applying unit 74 applies moisture to the roll body R1 around which the fabric M having air permeability is wound, the moisture applied to the fabric M1 of the first round not only penetrates into the fabric M as a liquid, but passes through the fabric M as water vapor through the voids in the weave of the fabric M. For this reason, when moisture is applied to the fabric M1 of the first round, some degree of moisture can also be applied to the fabric M from the second round in a short period of time. As a result, since the time in which moisture is applied to the fabric M becomes longer, it is possible to apply a large amount of moisture to the fabric M before the ejection unit 31 ejects the liquid within a limited period of time.

(2) The liquid ejector 11 includes the first detection unit 41 capable of detecting a first moisture content of the surface of the roll body R1, and the control unit 90 that controls the moisture applying unit 74. The first detection unit 41 is capable of detecting the first moisture content of the surface of the roll body R1, and the surface of the roll body R1 is the surface of the fabric M before the ejection unit 31 ejects the liquid. For this reason, by adjusting the amount of moisture to be applied to the roll body R1 in accordance with an increase or decrease in the moisture content of the surface of the roll body R1, the moisture content of the surface of the fabric M before the ejection unit 31 ejects the liquid can be adjusted such that it does not deviate from the range of a predetermined moisture content in accordance with the type of fabric M to be printed on.

(3) The liquid ejector 11 includes the second detection unit 42 capable of detecting the second moisture content of the surface of the fabric M that has been pulled out from the roll body R1 before the ejection unit 31 ejects the liquid. The first detection unit 41 is provided upstream of the moisture applying unit 74 in the direction of rotation of the roll body R1. Because the first detection unit 41 is provided upstream of the moisture applying unit 74 in the direction of rotation of the roll body R1, the first moisture content detected by the first detection unit 41 is the moisture content of the fabric M that is not in contact with air and to which moisture has been applied through another fabric M coming in contact with the fabric M. When moisture is to be applied to the fabric M, moisture is applied from the outer surface M1*a* of the fabric M1 of the first round by the moisture applying unit 74 after the first detection unit 41 detects the first moisture content. Thus, the second moisture content detected by the second detection unit 42 is the moisture content of the fabric M after moisture is applied from the outer surface M1*a* of the fabric M1 of the first round and the moisture content of the surface of the fabric M before the ejection unit 31 ejects the liquid. By calculating the amount of moisture applied to the fabric M from the outer surface M1*a* of the fabric M1 of the first round by the moisture applying unit 74 based on the difference between the first moisture content and the second moisture content, the amount of moisture to be applied to the roll body R1 can be adjusted.

(4) The liquid ejector 11 includes the second detection unit 42 capable of detecting the second moisture content of the surface of the fabric M that has been pulled out from the roll body R1 before the ejection unit 31 ejects the liquid and the control unit 90 that controls the moisture applying unit 74. The second detection unit 42 detects the second moisture content of the surface of the fabric M that has been pulled out from the roll body R1 before the ejection unit 31 ejects the liquid. In addition, the control unit 90 adjusts the amount of moisture to be applied to the roll body R1 according to an increase or decrease of the moisture content of the surface of the fabric M before the ejection unit 31 ejects the liquid. As a result, the moisture content of the surface of the fabric M before the ejection unit 31 ejects the liquid can be adjusted such that the moisture content does not deviate from the predetermined moisture content range according to the type of fabric M to be printed.

(5) The liquid ejector 11 includes the housing unit 82 with the opening 83 through which the fabric M can pass and capable of housing the roll body R1, and the third detection unit 43 capable of detecting a humidity inside the housing unit 82. Furthermore, the liquid ejector 11 includes the first air intake fan 48 that takes air into the housing unit 82 from the outside of the housing unit 82, and the first discharge fan 49 that discharges air from the inside of the housing unit 82 to the outside of the housing unit 82. Because the moisture applying unit 74 applies moisture to the roll body R1 using the air inside the housing unit 82, if the humidity inside the housing unit 82 is too high, the increase of the moisture content of the fabric M may not immediately stop even if the moisture applying unit 74 is stopped. In such a case as well, an increase in the moisture content of the fabric M can be curbed by adjusting the volume of air flowing inside the housing unit 82 and outside the housing unit 82 based on the humidity inside the housing unit 82.

(6) The liquid ejector 11 includes the shaft member 18 around which the fabric M is wound, the sixth detection unit 46 that detects a temperature of the outer surface 18*a* of the shaft member 18 as a contact surface in contact with the fabric M, and the cooling unit 55 that cools the shaft member 18. When the shaft member 18 around which the fabric M is wound is cooled and thus the temperature of the outer surface 18*a* of the shaft member 18 as a contact surface in contact with the fabric M becomes lower than or equal to the dew point temperature, the portion of the fabric M in contact with the surrounding air has water condensation. This can increase the amount of moisture applied to the fabric M from the surrounding air.

(7) A range in which moisture is applied to the roll body R1 in the width direction X that is the direction along the rotational axis of the roll body R1 is adjusted in accordance with the range in which the liquid is ejected. As moisture is applied to the fabric M, for example, the state of bleeding caused by ejection of the liquid to the fabric M changes. For this reason, the range in which moisture is required varies depending on the range in which the liquid is ejected. Since moisture is applied only in the moisture-required range by adjusting the range in which moisture is applied to the roll body R1, the amount of moisture used can be reduced.

(8) The amount of moisture to be applied to the roll body R1 in the width direction X that is the direction along the rotational axis of the roll body R1 is adjusted. This allows the state of bleeding caused by the liquid ejected to the fabric M to change in the width direction X that is the direction along the rotational axis of the roll body R1. That is, the printing image quality can be changed in the width direction X that is the direction along the rotational axis of the roll body R1.

(9) The liquid ejector 11 includes the moisture removing unit 85 that removes moisture from the roll body R1 held by the holding unit 19. When the moisture removing unit 85 removes moisture from the roll body R1 around which the fabric M having air permeability is wound, dry air passes the fabric M1 of the first round through the voids of the weave of the fabric M1 of the first round. For this reason, when moisture is removed from the fabric M1 of the first round, some degree of moisture can be removed from the fabric M from the second round as well in a short period of time. As a result, since the time in which moisture is removed the fabric M becomes longer, it is possible to remove a large amount of moisture from the fabric M before the ejection unit 31 ejects the liquid within a limited period of time. That is, this liquid ejector 11 makes it possible to apply a large amount of moisture to the fabric M before the ejection unit 31 ejects the liquid within a limited period of time, and to remove a large amount of moisture therefrom within a limited period of time.

Second Embodiment

A second embodiment is substantially the same as the first embodiment, and thus duplicate descriptions of the same configuration will be omitted by giving the same reference signs thereto. A liquid ejector 11 of the second embodiment does not include the first detection unit 41 and the second detection unit 42. In addition, the liquid ejector 11 of the second embodiment includes at least one of a fourth detection unit 44 and a fifth detection unit 45 to be described below. In addition, the liquid ejector 11 of the second embodiment and the liquid ejector 11 of the first embodiment differ in the detection unit that detects a detection result that is the basis of the control unit 90 for adjusting an amount of moisture to be applied and an amount of moisture to be removed.

Regarding Configuration of Each Unit Around Feeding Unit

Figure 8:
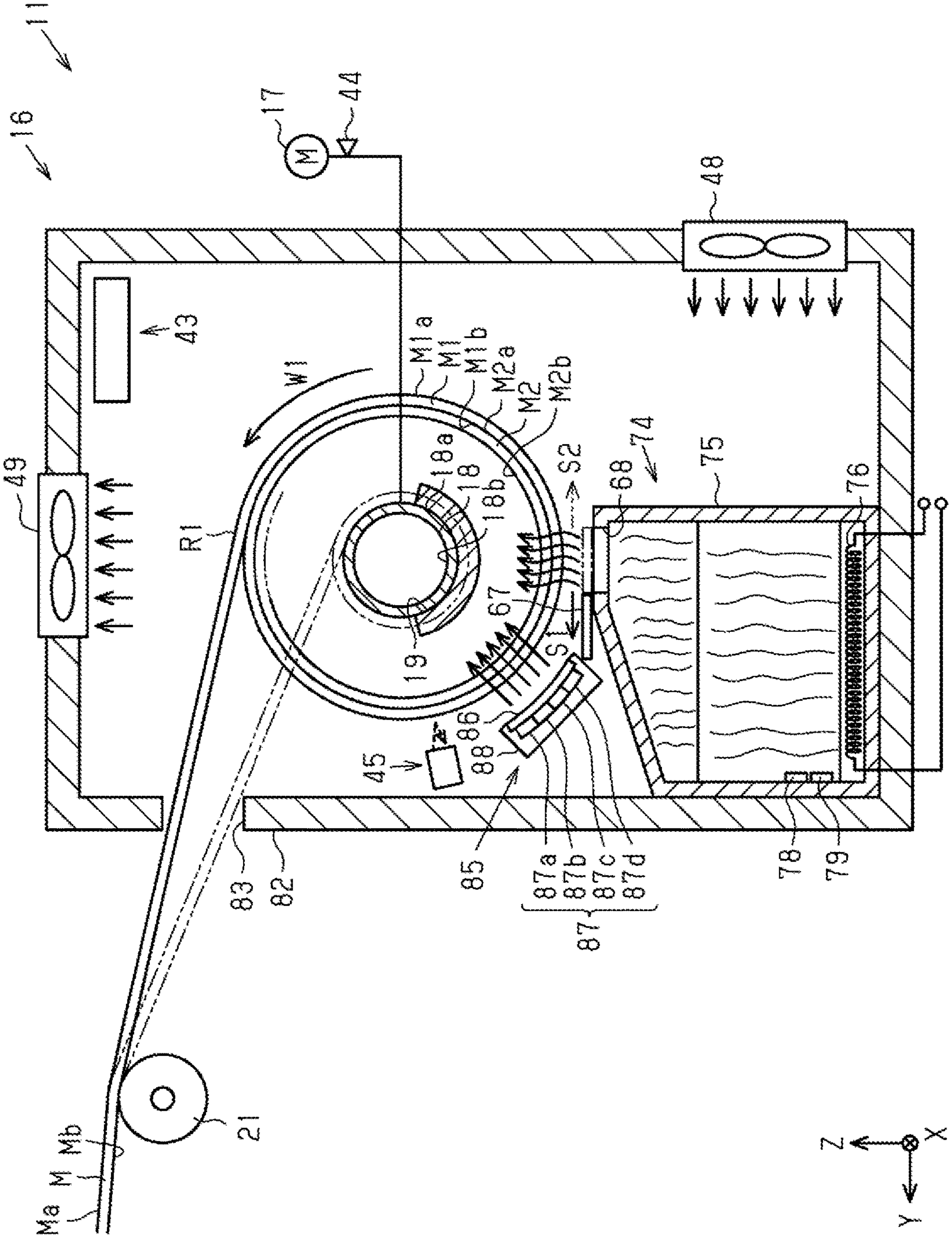
FIG. 8 is a schematic side view illustrating the feeding unit of the second embodiment.

The liquid ejector 11 may include the fourth detection unit 44 as illustrated in FIG. 8. The fourth detection unit 44 can detect an angular velocity of the roll body R1 when the fabric M is pulled out from the roll body R1. For example, a rotary speed meter may be provided on the shaft member 18 of the roll body R1, and the rotational speed meter may detect the angular velocity of the roll body R1. In addition, an encoder that detects an amount of rotation of the shaft member 18 may be provided in the shaft member 18 of the roll body R1 to enable the control unit 90 to calculate the angular velocity of the roll body R1 from the amount of rotation of the shaft member 18 per hour. Furthermore, an encoder may be provided on the rotational shaft of the feeding motor 17, or an encoder may be provided on one rotational shaft of the rotational shafts included in a rotation mechanism coupling the shaft member 18 of the roll body R1 to the feeding motor 17. When the speed at which the fabric M is pulled out from the roll body R1 is constant, if the angular velocity of the roll body R1 when the fabric M is pulled out from the roll body R1 is low, the time in which the outer surface M1*a* of the fabric M1 of the first round is in contact with the air inside the housing unit 82 becomes longer. That is, the fourth detection unit 44 is a detection unit for detecting the length of time in which the outer surface M1*a* of the fabric M1 of the first round is in contact with the air inside the housing unit 82.

The liquid ejector 11 may include the fifth detection unit 45. The fifth detection unit 45 can detect the diameter of the roll body R1 when the fabric M is pulled out from the roll body R1. In the present embodiment, the diameter of the roll body R1 is detected by an optical sensor measuring the distance between the optical sensor and the outer surface M1*a* of the fabric M1 of the first round. In addition, when a roller lightly presses the outer surface M1*a* of the fabric M1 and the roller operates following the outer surface M1*a* of the fabric M1, the position of the roller may be detected, so the diameter of the roll body R1 may be detected. When the speed at which the fabric M is pulled out from the roll body R1 is constant, if the diameter of the roll body R1 when the fabric M is pulled out from the roll body R1 is large, the time in which the outer surface M1*a* of the fabric M1 of the first round is in contact with the air inside the housing unit 82 becomes longer. That is, the fifth detection unit 45 is a detection unit for detecting the length of time in which the outer surface M1*a* of the fabric M1 of the first round is in contact with the air inside the housing unit 82.

Because both the fourth detection unit 44 and the fifth detection unit 45 are detection units for detecting the length of time in which the outer surface M1*a* of the fabric M1 of the first round is in contact with the air inside the housing unit 82, both units are not used simultaneously. However, the liquid ejector 11 may include both the fourth detection unit 44 and the fifth detection unit 45. For example, when a conveyance speed of the fabric M is constant and there is little unevenness in the surface of the fabric M, the time in which the outer surface M1*a* of the fabric M1 of the first round is in contact with the air inside the housing unit 82 can be more accurately calculated when the diameter of the roll body R1 is detected, than when the angular velocity of the roll body R1 is detected. However, when the conveyance speed of the fabric M is constant and the unevenness of the surface of the fabric M is large, the detection of the diameter of the roll body R1 may be unstable. Thus, the liquid ejector 11 may include both the fourth detection unit 44 and the fifth detection unit 45, and the fourth detection unit 44 and the fifth detection unit 45 may be used differently depending on the type of fabric M to be printed on.

Regarding Control Unit

Figure 9:
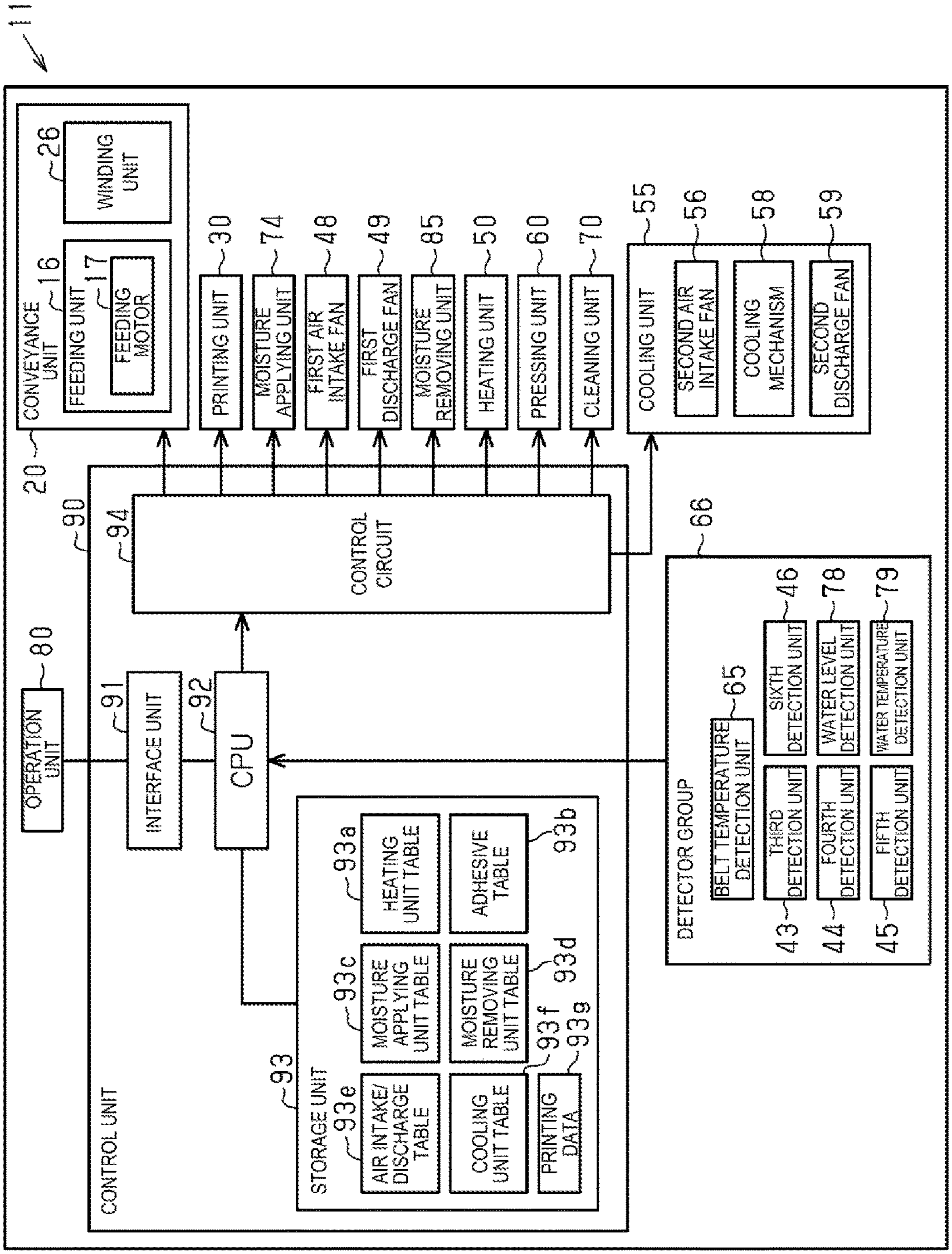
FIG. 9 is a block diagram illustrating a schematic configuration of a liquid ejector of the second embodiment.

The control unit 90 controls each unit of the liquid ejector 11 as illustrated in FIG. 9. An interface unit 91 enables the control unit 90 to transmit and receive data to and from an operation unit 80. A CPU 92 is an arithmetic processing unit for overall control of the liquid ejector 11. A storage unit 93 secures regions and work areas for storing programs of the CPU 92. The CPU 92 controls each unit of the liquid ejector 11 in compliance with a control circuit 94.

For example, operation modes of the liquid ejector 11 include a moisture application mode, a moisture removal mode, and a mode in which neither moisture application nor moisture removal is performed. A user selects an operation mode through the operation unit 80.

The storage unit 93 stores a heating unit table 93*a*, an adhesive table 93*b*, a moisture applying unit table 93*c*, a moisture removing unit table 93*d*, an air intake/discharge table 93*e*, a cooling unit table 93*f*, and the like. Further, a detector group 66 monitors the status inside the liquid ejector 11, and the control unit 90 controls each unit of the liquid ejector 11 based on the detection result. The detector group 66 includes a belt temperature detection unit 65, a third detection unit 43, the fourth detection unit 44, the fifth detection unit 45, the sixth detection unit 46, a water level detection unit 78, a water temperature detection unit 79, and the like. The detector group 66 includes at least one of the fourth detection unit 44 and the fifth detection unit 45.

To describe the moisture applying unit table 93*c* and the moisture removing unit table 93*d*, a case in which the fourth detection unit 44 is used among the fourth detection unit 44 and the fifth detection unit 45 will be described. Further, for a case in which the fifth detection unit 45 is used, "fourth detection unit 44" may be replaced with "fifth detection unit 45" in the following description.

The storage unit 93 stores the moisture applying unit table 93*c* in which an output value of the third detection unit 43 and an output value of the fourth detection unit 44 are associated with the target temperature of the water contained in the tank 75 of the moisture applying unit 74 corresponding to the output values. The third detection unit 43 detects the humidity of the air inside the housing unit 82. The fourth detection unit 44 detects the length of time in which the outer surface M1*a* of the fabric M1 of the first round is in contact with the air inside the housing unit 82.

For example, the control unit 90 reads the target temperature of the water contained in the tank 75 from the moisture applying unit table 93*c* based on the detection result of the third detection unit 43 and the detection result of the fourth detection unit 44. Then, the control unit 90 adjusts the output of the heater 76 so that the output value of the water temperature detection unit 79 reaches the target temperature of the water contained in the tank 75.

When a user selects the moisture application mode, an output value of the third detection unit 43 may be higher than a predetermined value. At this time, this status may be displayed on the display unit 81, and the operation mode of the liquid ejector 11 may automatically transition to the mode in which neither moisture application nor moisture removal is performed. When the output value of the third detection unit 43 is higher than the predetermined value, it is possible to determine that the control unit 90 does not need to drive the moisture applying unit 74 that applies moisture to the fabric M because the humidity inside the housing unit 82 is sufficiently high.

The moisture applying unit table 93*c* is configured such that the target temperature of the water contained in the tank 75 is higher when the humidity inside the housing unit 82 is low, and the target temperature of the water contained in the tank 75 is lower when the humidity inside the housing unit 82 is high. That is, the control unit 90 controls the moisture applying unit 74 such that the output of the heater 76 increases when the humidity inside the housing unit 82 is low, and the output of the heater 76 decreases when the humidity inside the housing unit 82 is high based on the detection result of the third detection unit 43. In this manner, the control unit 90 may adjust the amount of moisture to be applied to the roll body R1 by controlling the moisture applying unit 74 based on the detection result of the third detection unit 43.

More specifically, the control unit 90 adjusts the amount of moisture to be applied to the roll body R1 so that the output value of the third detection unit 43 falls within a predetermined humidity range. The predetermined humidity range is a range of humidity in which the moisture content of the fabric M housed in the housing unit 82 at the humidity falls within a predetermined moisture content range. The predetermined moisture content range is a range of the moisture content of the fabric M that can prevent deterioration of the image quality for the type of the fabric M to be printed on. That is, the predetermined moisture content range is a range of the moisture content of the fabric M suitable for printing. The moisture content of the fabric M suitable for printing varies depending on the type of fabric M. The type of fabric M includes the type of material of the fabric M, the weaving method of the fabric M, the thickness of the fabric M, and the like. For this reason, the predetermined humidity range of output values of the third detection unit 43 varies depending on the type of fabric M. For example, the predetermined humidity range of output values of the third detection unit 43 is determined by a user selecting the type of fabric M with the operation unit 80.

The moisture applying unit table 93*c* is configured such that the output of the heater 76 increases when the time in which the outer surface M1*a* of the fabric M1 of the first round is in contact with the air inside the housing unit 82 is short. In addition, the moisture applying unit table 93*c* is configured such that the output of the heater 76 decreases when the time in which the outer surface M1*a* of the fabric M1 of the first round is in contact with the air inside the housing unit 82 is long. Thus, the control unit 90 controls the moisture applying unit 74 such that the output of the heater 76 increases when the time in which the outer surface M1*a* of the fabric M1 of the first round is in contact with the air inside the housing unit 82 is short based on the detection result of the fourth detection unit 44. In addition, the control unit 90 controls the moisture applying unit 74 such that the output of the heater 76 decreases when the time in which the outer surface M1*a* of the fabric M1 of the first round is in contact with the air inside the housing unit 82 is long based on the detection result of the fourth detection unit 44.

When the output of the heater 76 increases, the temperature of the water contained in the tank 75 rises, and when the output of the heater 76 decreases, the temperature of the water contained in the tank 75 drops. In addition, the temperature of the water contained in the tank 75 is adjusted by adjusting the output of the heater 76. The higher the temperature of the water contained in the tank 75, the greater the amount of vapor generated per unit time, and the lower the temperature of the water contained in the tank 75, the smaller the amount of vapor generated per unit time. In this manner, the control unit 90 adjusts the amount of moisture to be applied to the roll body R1 per unit time by controlling the moisture applying unit 74 based on the detection result of the fourth detection unit 44. As a result, even if the time in which the outer surface M1*a* of the fabric M1 of the first round is in contact with the air inside the housing unit 82 changes, it is possible to control change in the amount of moisture to be applied to the roll body R1.

The storage unit 93 includes the moisture removing unit table 93*d* in which an output value of the third detection unit 43 and an output value of the fourth detection unit 44 are associated with the quantity of the heating plates 87 to be driven by the moisture removing unit 85 corresponding to the output values. For example, the control unit 90 reads the quantity of the heating plates 87 to be driven from the moisture removing unit table 93*d* based on the detection result of the third detection unit 43 and the detection result of the fourth detection unit 44. Then, after the heating plates 87 to be heated are selected, the control unit 90 drives the selected heating plates 87. The amount of moisture to be removed by the moisture removing unit 85 from the fabric M is adjusted by driving the selected heating plates 87.

The amount of moisture to be removed by the moisture removing unit 85 from the fabric M is adjusted by adjusting the quantity of the heating plates 87 to be driven. More specifically, when the quantity of the heating plates 87 to be driven increases, the amount of heat emitted from the radiation plate 86 is increased, and when the quantity of the heating plates 87 to be driven is reduced, the amount of heat emitted from the radiation plate 86 is reduced. That is, if the quantity of the heating plates 87 to be driven is increased, the amount of moisture removed by the moisture removing unit 85 from the fabric M increases, and when the quantity of the heating plates 87 to be driven is reduced, the amount of moisture removed by the moisture removing unit 85 from the fabric M is reduced.

When a user selects the moisture removal mode, the output value of the third detection unit 43 may be lower than a predetermined value. At this time, this status may be displayed on the display unit 81, and the operation mode of the liquid ejector 11 may automatically transition to the mode in which neither moisture application nor moisture removal is performed. When the output value of the third detection unit 43 is lower than the predetermined value, it is possible to determine that the control unit 90 does not need to drive the moisture removing unit 85 that removes moisture from the fabric M because the humidity inside the housing unit 82 is sufficiently low.

When the moisture removing unit table 93*d* is configured such that the quantity of the heating plates 87 to be driven is large when the humidity inside the housing unit 82 is high, and the quantity of the heating plates 87 to be driven is small when the humidity inside the housing unit 82 is low. That is, the control unit 90 controls the moisture removing unit 85 such that the quantity of the heating plates 87 to be driven is large when the humidity inside the housing unit 82 is high, and the quantity of the heating plates 87 to be driven is small when the humidity inside the housing unit 82 is low based on the detection result of the third detection unit 43. In this way, the control unit 90 adjusts the amount of moisture to be removed from the roll body R1. More specifically, the control unit 90 adjusts the amount of moisture to be removed from the roll body R1 so that the output value of the third detection unit 43 falls within the predetermined humidity range.

The moisture removing unit table 93*d* is configured such that the quantity of the heating plates 87 to be driven is large when the time in which the outer surface M1*a* of the fabric M1 of the first round is in contact with the air inside the housing unit 82 is short. In addition, the moisture removing unit table 93*d* is configured such that the quantity of the heating plates 87 to be driven is small when the time in which the outer surface M1*a* of the fabric M1 of the first round is in contact with the air inside the housing unit 82 is long. Thus, the control unit 90 controls the moisture removing unit 85 such that the quantity of the heating plates 87 to be driven is large when the time in which the outer surface M1*a* of the fabric M1 of the first round is in contact with the air inside the housing unit 82 is short based on the detection result of the fourth detection unit 44. In addition, the control unit 90 controls the moisture removing unit 85 such that the quantity of the heating plates 87 to be driven is small when the time in which the outer surface M1*a* of the fabric M1 of the first round is in contact with the air inside the housing unit 82 is long based on the detection result of the fourth detection unit 44.

When the quantity of the heating plates 87 to be driven increases, the amount of heat emitted from the radiation plate 86 is increased, and when the quantity of the heating plates 87 to be driven is reduced, the amount of heat emitted from the radiation plate 86 is reduced. That is, if the quantity of the heating plates 87 to be driven is increased, the amount of moisture removed by the moisture removing unit 85 from the fabric M per unit time increases, and when the quantity of the heating plates 87 to be driven is reduced, the amount of moisture removed by the moisture removing unit 85 from the fabric M per unit time is reduced. In this manner, the control unit 90 adjusts the amount of moisture to be removed from the roll body R1 per unit time by controlling the moisture removing unit 85 based on the detection result of the fourth detection unit 44. As a result, even if the time in which the outer surface M1*a* of the fabric M1 of the first round is in contact with the air inside the housing unit 82 changes, it is possible to curb change in the amount of moisture to be removed from the roll body R1.

Regarding Flow of Adjusting Amount of Moisture to be Applied

Figure 10:
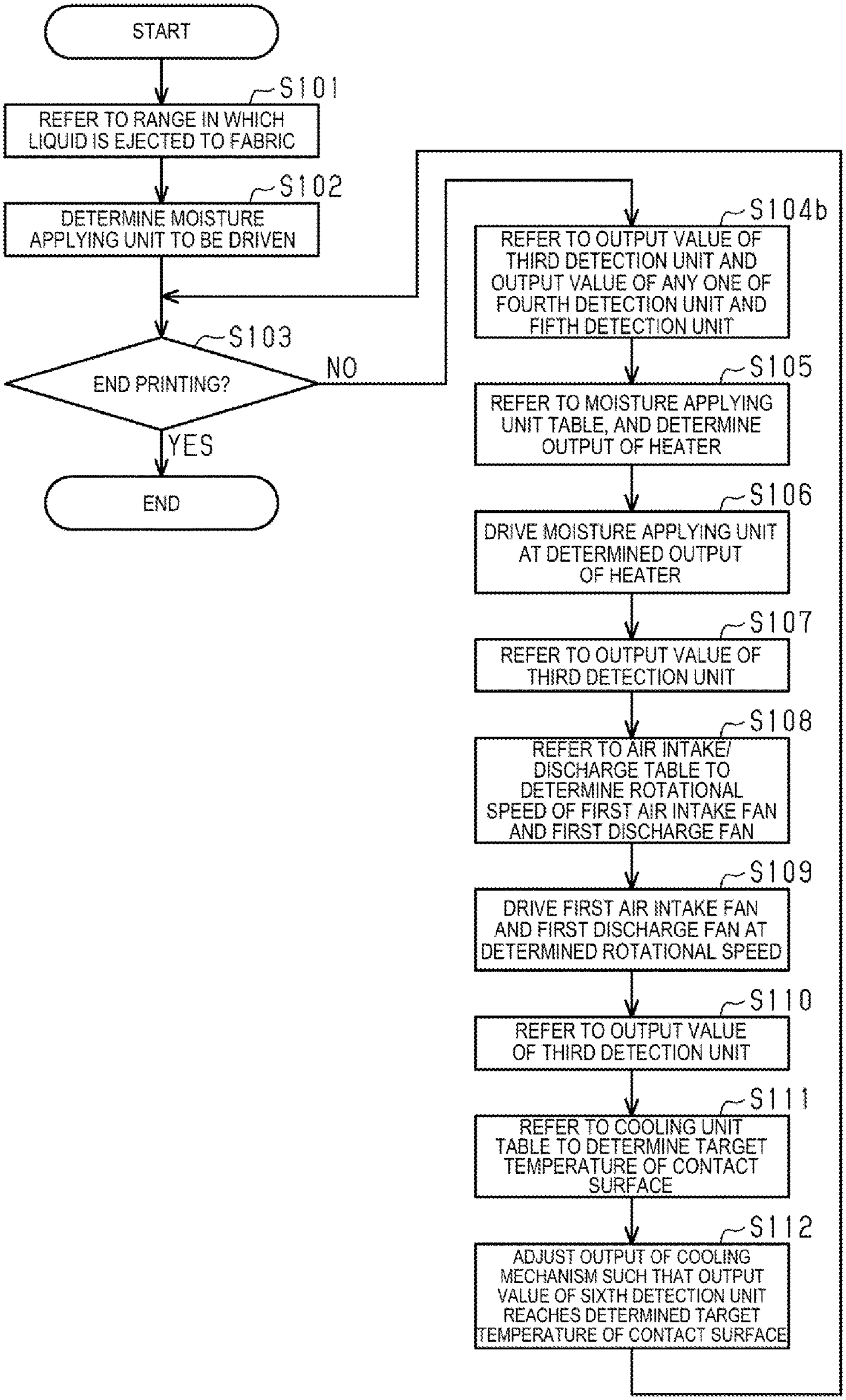
FIG. 10 is a flowchart of a control unit of the second embodiment when the control unit adjusts an amount of moisture to be applied.

When the operation mode of the liquid ejector 11 is the moisture application mode, the control unit 90 adjusts the amount of moisture to be applied to the roll body R1 by controlling the moisture applying unit 74 as illustrated in FIG. 10. Further, only matters different from the flow in the first embodiment will be described.

In step S103, the control unit 90 determines whether to end the printing. If the printing is to be ended, the answer to step S103 is YES, and the control unit 90 ends the flow. If the printing is not to be ended, the answer to step S103 is NO, and the control unit 90 shifts the process to step S104*b*.

In step S104*b*, the control unit 90 refers to the output value of the third detection unit 43, and the output value of any one of the fourth detection unit 44 and the fifth detection unit 45. Then, in step S105, the control unit 90 refers to the moisture applying unit table 93*c* to determine output of the heater 76. Then, the control unit 90 drives the moisture applying unit 74 at the determined output of the heater 76 in step S106. In this manner, the control unit 90 adjusts the amount of moisture to be applied to the roll body R1 by controlling the moisture applying unit 74 based on the detection result of the third detection unit 43 and the detection result of any one of the fourth detection unit 44 and the fifth detection unit 45.

Regarding Flow of Adjusting Amount of Moisture to be Removed

Figure 11:
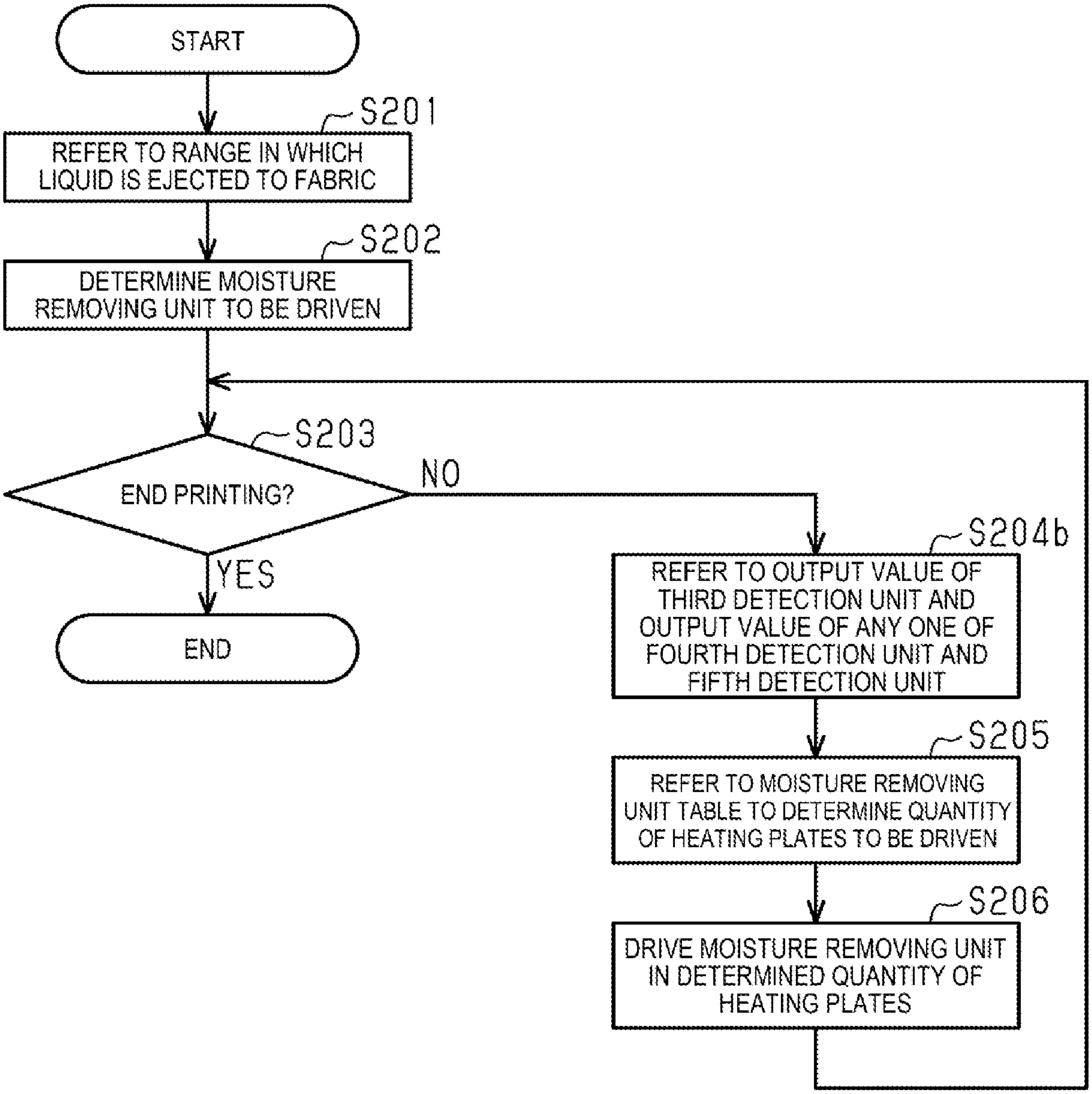
FIG. 11 is a flowchart of the control unit of the second embodiment when the control unit adjusts an amount of moisture to be removed.

When the operation mode of the liquid ejector 11 is the moisture removal mode, the control unit 90 adjusts the amount of moisture to be removed from the roll body R1 by controlling the moisture removing unit 85 as illustrated in FIG. 11. Further, only matters different from the flow in the first embodiment will be described.

In step S203, the control unit 90 determines whether to end the printing. If the printing is to be ended, the answer to step S203 is YES, and the control unit 90 ends the flow. If the printing is not to be ended, the answer to step S203 is NO, and the control unit 90 shifts the process to step S204*b*.

In step S204*b*, the control unit 90 refers to the output value of the third detection unit 43, and the output value of any one of the fourth detection unit 44 and the fifth detection unit 45. Then, in step S205, the control unit 90 refers to the moisture removing unit table 93*d* to determine the quantity of the heating plates 87 to be driven. Then, in step S206, the control unit 90 drives the moisture removing unit 85 with the determined quantity of the heating plates 87. In this manner, the control unit 90 adjusts the amount of moisture to be removed from the roll body R1 by controlling the moisture removing unit 85 based on the detection result of the third detection unit 43 and the detection result of any one of the fourth detection unit 44 and the fifth detection unit 45.

Actions of Embodiment

Actions of the embodiment will be described.

The second embodiment is substantially the same as the first embodiment, and thus duplicate descriptions of the same actions as those of the first embodiment will be omitted.

A user desirably causes the roll body R1 to be held in the holding unit 19 inside the housing unit 82 after the moisture content of the fabric M in the roll body R1 around which the fabric M is wound is measured. Then, the user desirably selects the operation mode of the liquid ejector 11 in accordance with the measurement result of the moisture content through the operation unit 80. The user selects the moisture application mode when the moisture content of the fabric M is lower than a predetermined value. Further, the predetermined value mentioned here is a value at which the image quality of the fabric M may be affected by the low moisture content of the fabric M.

The control unit 90 starts control of the operation of each unit of the liquid ejector 11. The third detection unit 43 detects humidity inside the housing unit 82. The control unit 90 may adjust the amount of moisture to be applied to the roll body R1 by controlling the moisture applying unit 74 based on the detection result of the third detection unit 43.

It is desirable for the moisture applying unit 74 to apply moisture to the roll body R1 after the roll body R1 before the fabric M is pulled out therefrom is housed in the housing unit 82 for a certain period of time before printing is started. After that, it is desirable to pull the fabric M out from the roll body R1 and start printing.

For example, it is desirable to measure in advance data of the relationship between the humidity inside the housing unit 82 in which the roll body R1 is housed and the moisture content of the fabric M when it is left at the humidity for a long period of time according to the type of fabric M to be printed on. For example, it is desirable to measure in advance data of the relationship between the humidity inside the housing unit 82 in which the roll body R1 is housed and the time taken for moisture applied to the fabric M1 of the first round to affect the moisture content of the fabric M2 of the second round. In this way, it is possible to predict the range of humidity inside the housing unit 82 in which the moisture content of the fabric M to be printed on falls within the predetermined moisture content range when the time in which the fabric M1 of the first round is in contact with the air inside the housing unit 82 is detected. Thus, it is desirable to configure the moisture applying unit table 93*c* based on the data.

The fourth detection unit 44 and the fifth detection unit 45 are detection units for detecting the length of time in which the outer surface M1*a* of the fabric M1 of the first round is in contact with the air inside the housing unit 82. That is, the control unit 90 adjusts the amount of moisture to be applied to the roll body R1 by controlling the moisture applying unit 74 based on the detection result of the third detection unit 43 and the detection result of at least one of the fourth detection unit 44 and the fifth detection unit 45.

In this way, it is possible to curb deterioration in the image quality by the moisture applying unit 74 adjusting the moisture content of the fabric M to fall within the predetermined moisture content range according to the type of fabric M to be printed on.

Effects of Embodiment

Effects of the present embodiment will now be described.

The liquid ejector 11 of the present embodiment obtains the same effects as in (1) and (5) to (9) of the first embodiment.

(10) The liquid ejector 11 includes the housing unit 82 with the opening 83 through which the fabric M can pass and capable of housing the roll body R1, the third detection unit 43 capable of detecting a humidity inside the housing unit 82, and the control unit 90 that controls the moisture applying unit 74. The moisture applying unit 74 applies moisture to the roll body R1 through the air inside the housing unit 82 housing the roll body R1. The amount of moisture contained in the air inside the housing unit 82 depends on the humidity inside the housing unit 82. Then, the control unit 90 adjusts the amount of moisture to be applied to the roll body R1 in accordance with the humidity inside the housing unit 82 housing the roll body R1. As a result, the moisture content of the surface of the fabric M before the ejection unit 31 ejects the liquid can be adjusted such that the moisture content falls within the predetermined moisture content range according to the type of fabric M to be printed.

(11) The liquid ejector 11 includes the fourth detection unit 44 capable of detecting an angular velocity of the roll body R1 when the fabric M is pulled out from the roll body R1. When the speed at which the fabric M is pulled out from the roll body R1 is constant, if the angular velocity of the roll body R1 when the fabric M is pulled out from the roll body R1 is low, the time in which the outer surface M1*a* of the fabric M1 of the first round is in contact with the air inside the housing unit 82 becomes longer. If the time in which the outer surface M1*a* of the fabric M1 of the first round is in contact with the air inside the housing unit 82 becomes longer, the amount of moisture to be applied to the roll body R1 increases. The fourth detection unit 44 is a detection unit for detecting the length of time in which the outer surface M1*a* of the fabric M1 of the first round is in contact with the air inside the housing unit 82 since it detects the angular velocity of the roll body R1. Thus, by adjusting the amount of moisture to be applied to the roll body R1 per unit time based on the detection result of the fourth detection unit 44, change in the amount of moisture to be applied can be curbed even if the time in which the roll body R1 is in contact with the air inside the housing unit 82 changes.

(12) The liquid ejector 11 includes the fifth detection unit 45 capable of detecting the diameter of the roll body R1 when the fabric M is pulled out from the roll body R1. When the speed at which the fabric M is pulled out from the roll body R1 is constant, if the diameter of the roll body R1 when the fabric M is pulled out from the roll body R1 is large, the time in which the outer surface M1*a* of the fabric M1 of the first round is in contact with the air inside the housing unit 82 becomes longer. If the time in which the outer surface M1*a* of the fabric M1 of the first round is in contact with the air inside the housing unit 82 becomes longer, the amount of moisture to be applied to the roll body R1 increases. The fifth detection unit 45 is a detection unit for detecting the length of time in which the outer surface M1*a* of the fabric M1 of the first round is in contact with the air inside the housing unit 82 since it detects the diameter of the roll body R1. Thus, by adjusting the amount of moisture to be applied to the roll body R1 per unit time based on the detection result of the fifth detection unit 45, change in the amount of moisture to be applied can be curbed even if the time in which the roll body R1 is in contact with the air inside the housing unit 82 changes.

Modified Examples of Embodiment

The present embodiment can be modified as below and implemented. The present embodiment and the following modified examples thereof can be implemented in combination within the range with no technical contradiction.

Figure 12:
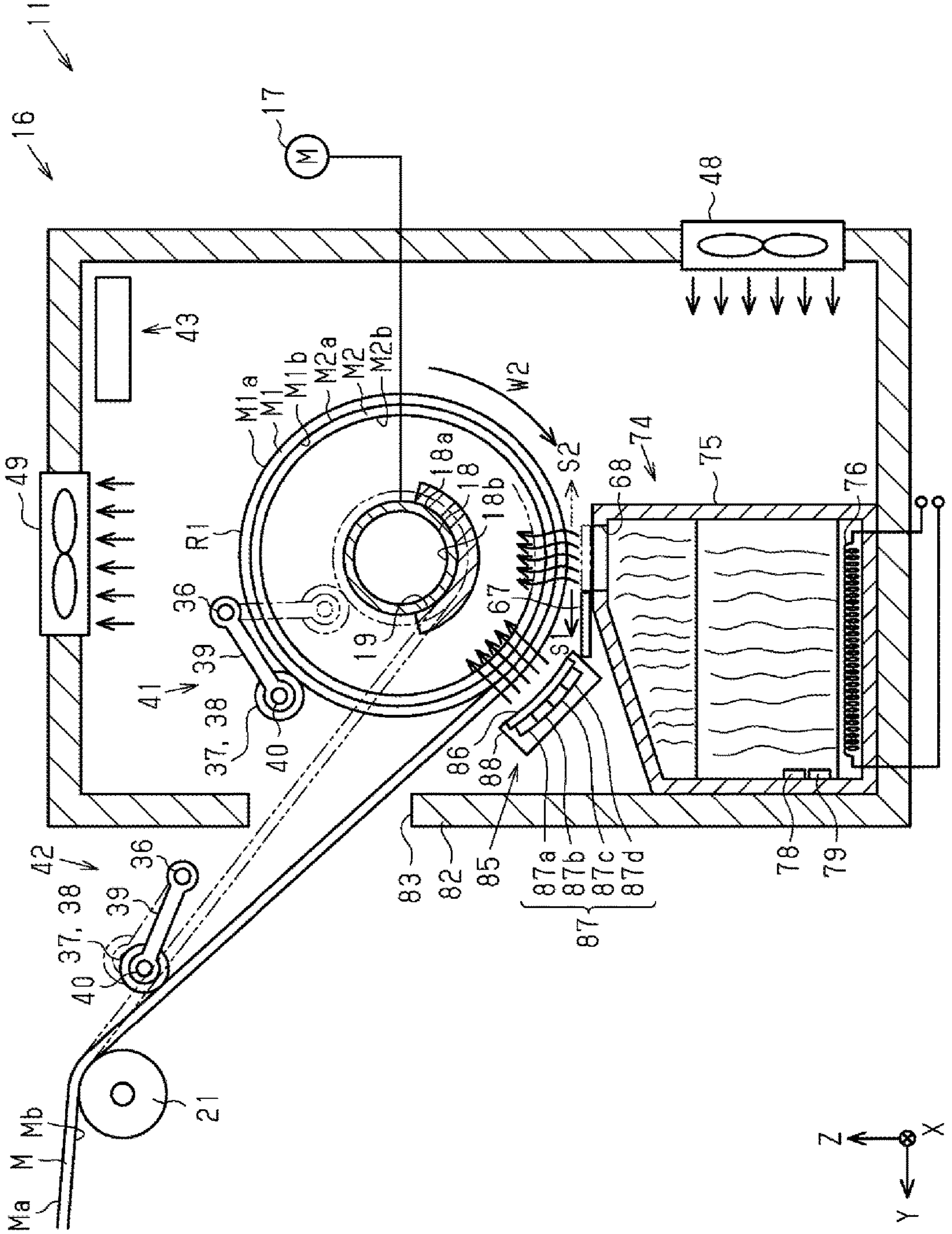
FIG. 12 is a schematic side view illustrating a feeding unit according to a first modified example of the first embodiment.

In a first modified example of the first embodiment, because the roll body R1 rotates in the clockwise direction W2 due to the feeding motor 17 causing the shaft member 18 to rotate in the clockwise direction W2, the fabric M is pulled out from the roll body R1 as illustrated in FIG. 12. In the present modified example, the first detection unit 41 is provided upstream of both the moisture applying unit 74 and the moisture removing unit 85 in the direction of rotation of the roll body R1. More specifically, when moisture is applied to the fabric M1, the moisture applying unit 74 applies moisture to the outer surface M1*a* of the fabric M1 of the first round after the first detection unit 41 detects the first moisture content. In addition, when moisture is removed from the fabric M1, the moisture removing unit 85 removes moisture from the outer surface M1*a* of the fabric M1 of the first round after the first detection unit 41 detects the first moisture content. For this reason, it is possible to adjust the amount of moisture to be applied to the outer surface M1*a* to which moisture will be applied from then on, depending on the value of the first moisture content. In the present modified example, the first detection unit 41 detects the first moisture content of the side opposite to the printed surface Ma, and the second detection unit 42 detects the second moisture content of the printed surface Ma. Thus, it is desirable for the detection value of the first moisture content to help correct the difference in moisture content of the front and back surfaces.

Figure 13:
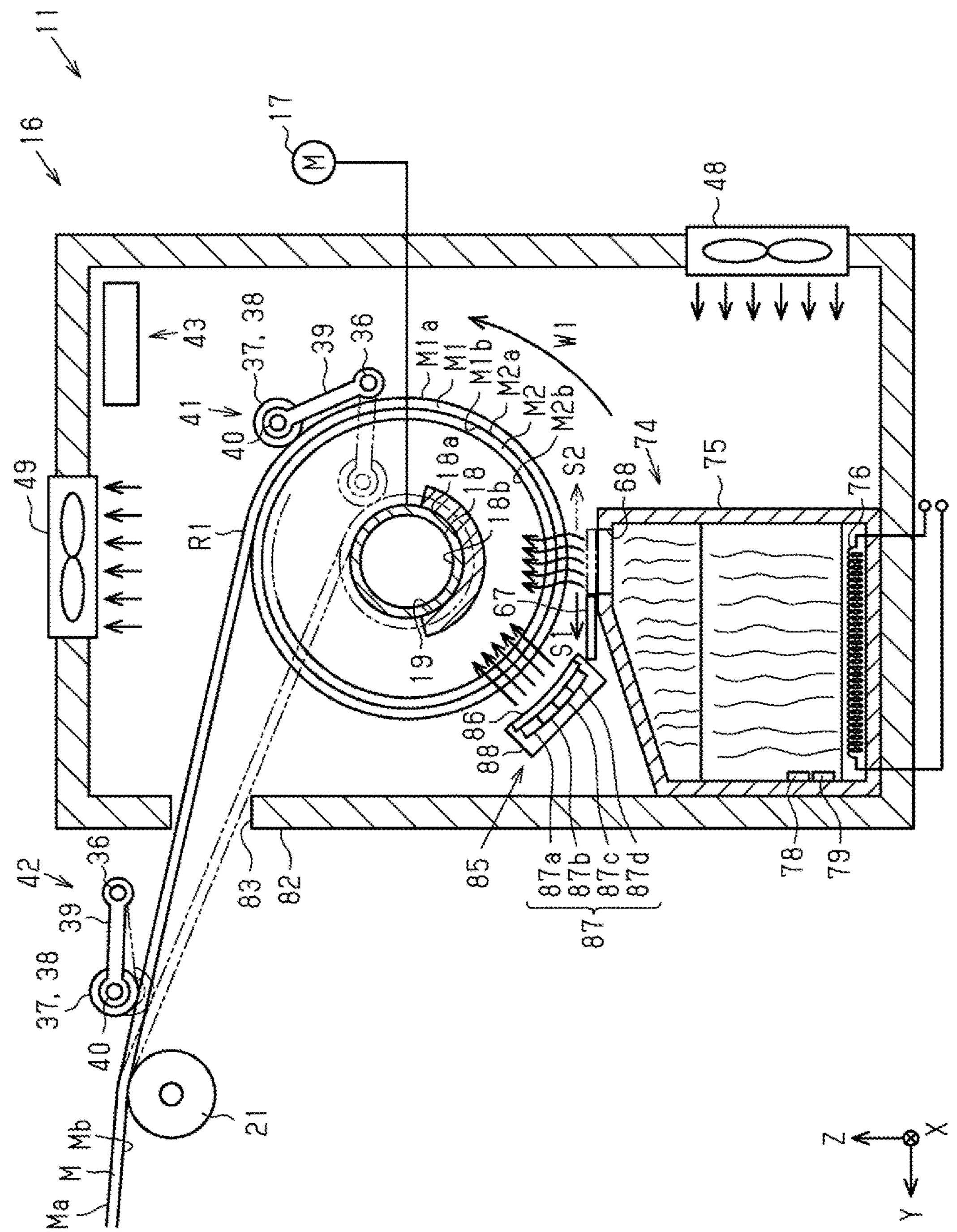
FIG. 13 is a schematic side view illustrating a feeding unit according to a second modified example of the first embodiment.

In a second modified example of the first embodiment, because the roll body R1 rotates in the counterclockwise direction W1 due to the feeding motor 17 causing the shaft member 18 to rotate in the counterclockwise direction W1, the fabric M is pulled out from the roll body R1 as illustrated in FIG. 13. In the present modified example, the first detection unit 41 is provided downstream of both the moisture applying unit 74 and the moisture removing unit 85 in the direction of rotation of the roll body R1. More specifically, when moisture is applied to the fabric M1, the moisture applying unit 74 applies moisture to the outer surface M1*a* of the fabric M1 of the first round, and then the first moisture content is detected by the first detection unit 41. In addition, when moisture is removed from the fabric M1, the moisture removing unit 85 removes moisture from the outer surface M1*a* of the fabric M1 of the first round, and then the first moisture content is detected by the first detection unit 41. As a result, the value of the first moisture content detected by the first detection unit 41 becomes close to the value of the second moisture content detected by the second detection unit 42. That is, when the liquid ejector 11 includes the first detection unit 41 and does not include the second detection unit 42, the control unit 90 causes the first detection unit 41 to obtain a value close to the second moisture content of the printed surface Ma in the fabric M after being pulled out from the roll body R1. Thus, the control unit 90 can adjust the amount of moisture to be applied to the roll body R1 based on the moisture content of the printed surface Ma of the fabric M after being pulled out from the roll body R1 by using the first detection unit 41.

Figure 14:
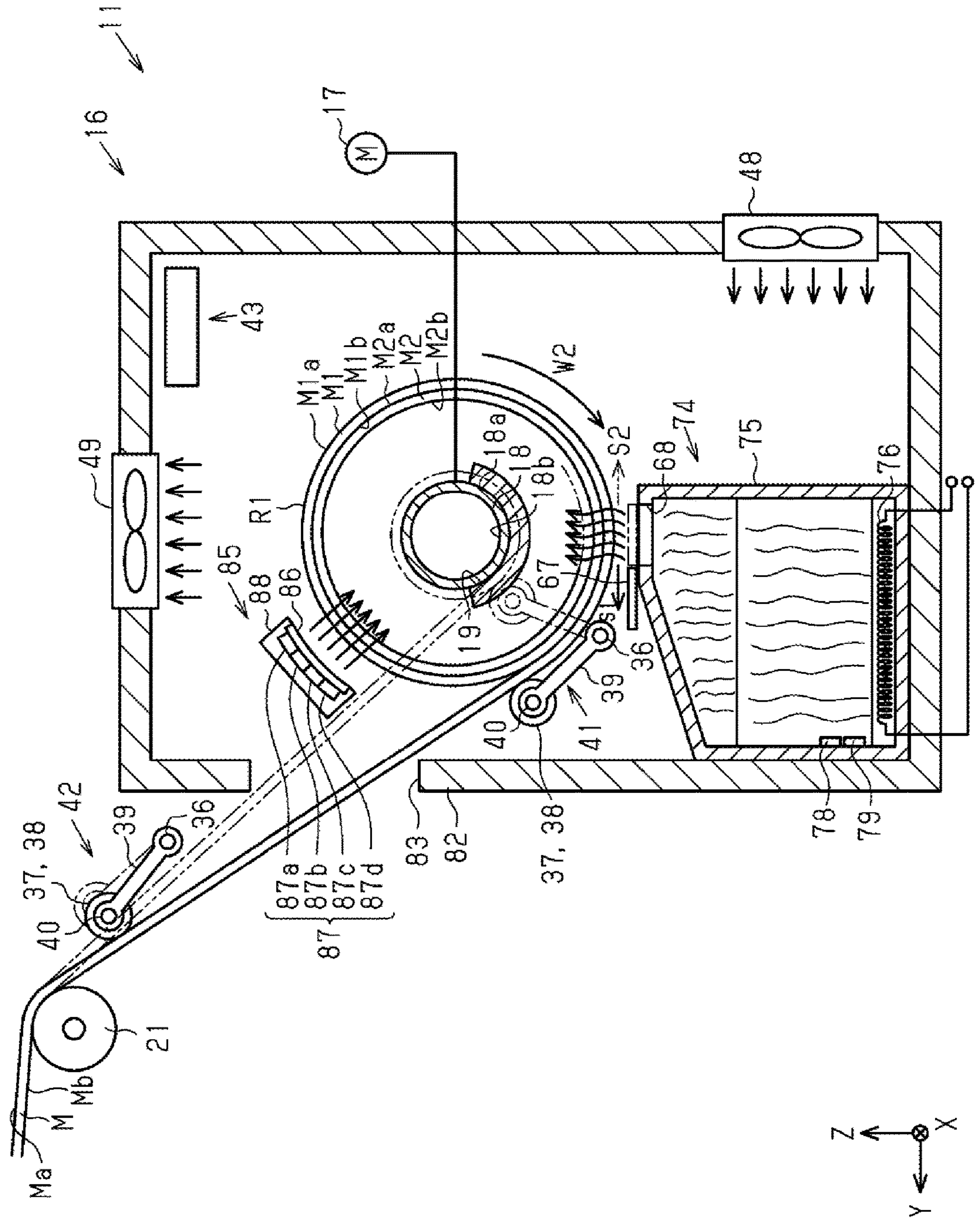
FIG. 14 is a schematic side view illustrating a feeding unit according to a third modified example of the first embodiment.

In a third modified example of the first embodiment, because the roll body R1 rotates in the clockwise direction W2 due to the feeding motor 17 causing the shaft member 18 to rotate in the clockwise direction W2, the fabric M is pulled out from the roll body R1 as illustrated in FIG. 14. In the present modified example, the first detection unit 41 is provided downstream of both the moisture applying unit 74 and the moisture removing unit 85 in the direction of rotation of the roll body R1. More specifically, when moisture is applied to the fabric M1, the moisture applying unit 74 applies moisture to the outer surface M1*a* of the fabric M1 of the first round, and then the first moisture content is detected by the first detection unit 41. In addition, when moisture is removed from the fabric M1, the moisture removing unit 85 removes moisture from the outer surface M1*a* of the fabric M1 of the first round, and then the first moisture content is detected by the first detection unit 41. As a result, the value of the first moisture content detected by the first detection unit 41 becomes close to the value of the second moisture content detected by the second detection unit 42. That is, when the liquid ejector 11 includes the first detection unit 41 and does not include the second detection unit 42, the control unit 90 causes the first detection unit 41 to obtain a value close to the second moisture content of the printed surface Ma in the fabric M after being pulled out from the roll body R1. Thus, the control unit 90 can adjust the amount of moisture to be applied to the roll body R1 based on the moisture content of the printed surface Ma of the fabric M after being pulled out from the roll body R1 by using the first detection unit 41. In the present modified example, the first detection unit 41 detects the first moisture content of the side opposite to the printed surface Ma, and the second detection unit 42 detects the second moisture content of the printed surface Ma. Thus, it is desirable for the detection value of the first moisture content to help correct the difference in moisture content of the front and back surfaces.

In the first embodiment, the second detection unit 42 may detect the moisture content of the surface opposite to the printed surface Ma of the fabric M after being pulled out from the roll body R1. When moisture is applied to the fabric M1 of the first round in the state of the roll body R1, moisture is also applied to the fabric M2 of the second round, and thus the time in which moisture is applied becomes longer. As a result, the moisture contents of the outer surface M1*a* and the inner surface M1*b* of the roll body R1 are close. Thus, it is possible to obtain a value close to the moisture content of the printed surface Ma by detecting the moisture content of the surface opposite to the printed surface Ma.

In the first embodiment, the liquid ejector 11 may include two second detection units 42. One of the second detection units 42 may detect the moisture content of the surface on the side to be printed, and the other second detection unit 42 may detect the moisture content of the surface opposite to the surface on the side to be printed. For example, a fabric M with a large thickness may have a moisture content of the surface on the side to be printed different from the moisture content of the surface opposite to the surface on the side to be printed. In such a case, the moisture applying unit 74 can also be controlled such that the moisture contents of both surfaces do not deviate from a predetermined moisture content range.

In the first embodiment, the liquid ejector 11 may include at least one of the fourth detection unit 44 and the fifth detection unit 45. The control unit 90 can predict a change in the amount of moisture to be applied to the roll body R1 when printing is continued. That is, because the control unit 90 can predict that the amount of moisture to be applied will be excessive or the amount of moisture to be applied will be insufficient when printing is continued, the moisture content of the printed surface Ma can be adjusted more accurately.

In the second embodiment, the liquid ejector 11 may include the third detection unit 43, and may not include the fourth detection unit 44 and the fifth detection unit 45. For example, when the time in which the outer surface M1*a* of the fabric M1 of the first round is in contact with the air inside the housing unit 82 is sufficiently long compared to the time that affects the moisture content of the fabric M2 of the second round, the influence of the time in which the outer surface M1*a* of the fabric M1 of the first round is in contact with the air inside the housing unit 82 is less. That is, when the printing speed of the liquid ejector 11 is low, the fourth detection unit 44 and the fifth detection unit 45 need not be provided.

In the second embodiment, the liquid ejector 11 may include the second detection unit 42. By controlling the humidity inside the housing unit 82, the second detection unit 42 can check whether the moisture content of the fabric M to be printed on is within the predetermined moisture content range.

The control unit 90 may adjust the amount of moisture to be applied to the roll body R1 by controlling the moisture applying unit 74 based on the speed of the fabric M being pulled out from the roll body R1. When the speed of the fabric M being pulled out from the roll body R1 is low, the amount of moisture to be applied to the roll body R1 per unit time increases. The speed of the fabric M being pulled out from the roll body R1 is the conveyance speed of the conveyor belt 22. Thus, the control unit 90 can adjust the moisture content of the printed surface Ma by adjusting the amount of moisture to be applied to the roll body R1 based on the conveyance speed of the conveyor belt 22.

The control unit 90 may estimate the current diameter of the roll body R1 from the information of the roll body R1, such as the diameter of the roll body R1 when the printing is started, the thickness of the fabric M, and the like, and the conveyance distance from the start of the printing. Furthermore, the control unit 90 may estimate the current angular velocity of the roll body R1 from the information of the roll body R1, such as the diameter of the roll body R1 when the printing is started, the thickness of the fabric M, and the like, the conveyance distance, and the current conveyance speed.

A heater may be embedded in the wall of the housing unit 82. When the humidity inside the housing unit 82 is high, water condensation occurs on a surface of the wall of the housing unit 82, and thus, the heater can curb reduction of the moisture applied to the roll body R1.

The liquid ejector 11 may be a liquid ejector 11 that ejects a liquid other than ink. State of the liquid ejected in a small amount of droplets from the liquid ejector 11 include granular, tear-like, and strand-like shapes with tails. The liquid mentioned here may be of a material that can be ejected from the liquid ejector 11. For example, the liquid may be a substance in a liquid phase, and also include a liquid with high or low viscosity, or a fluid state substance such as sol, gel water, other inorganic solvent, organic solvent, solution, a liquid resin, liquid metal, molten metal, or the like. The liquid includes not only a liquid as a state of substance, but also particles of a functional material made of a solid such as pigment or metal particles dissolved, dispersed or mixed in a solvent, or the like. Exemplary examples of liquid include ink, liquid crystal, and the like as described in the above-described embodiments. Ink mentioned here includes general water-based ink and oil-based ink and various liquid compositions such as gel ink and a hot-melt ink. For example, a specific example of the liquid ejector 11 includes a device that ejects a liquid including materials such as an electrode material and a color material used in manufacture of liquid crystal displays, electroluminescent displays, surface light emitting displays, color filters and the like in a dispersed or dissolved form. The liquid ejector 11 may be a device that ejects bioorganic substances used for biochip manufacturing, a device used as a precision pipette to eject a liquid as a sample, a printing device, a micro dispenser, or the like. The liquid ejector 11 may be a device that ejects a lubricant to a precision machine such as a watch or a camera in a pinpoint manner, or a device that ejects a transparent resin liquid such as a UV curing resin onto a substrate in order to produce a tiny hemispherical lens, an optical lens, or the like used for optical communication elements, and the like. The liquid ejector 11 may be a device that ejects an acid or alkali etching solution to etch a substrate or the like.

Technical Concepts and Effects Thereof Ascertained from Embodiments and Modified Examples Hereinafter, technical concepts and effects thereof ascertained from the above-described embodiments and modified examples will be described.

(A) A liquid ejector includes a holding unit capable of holding a roll body around which a fabric is wound, a conveyance unit capable of pulling out the fabric from the roll body to convey the fabric, an ejection unit capable of ejecting a liquid to the fabric pulled out from the roll body, and a moisture applying unit that applies moisture to the roll body held by the holding unit.

According to this configuration, when the moisture applying unit applies moisture to the roll body around which the fabric having air permeability is wound, the moisture applied to the fabric of the first round not only penetrates into the fabric as a liquid, but passes through the fabric as water vapor through voids in the weave of the fabric. For this reason, when moisture is applied to the fabric of the first round, some degree of moisture can also be applied to the fabric from the second round in a short period of time. As a result, since the time in which moisture is applied to the fabric becomes longer, it is possible to apply a large amount of moisture to the fabric before the ejection unit ejects the liquid within a limited period of time.

(B) The liquid ejector includes a first detection unit capable of detecting a first moisture content of a surface of the roll body, and a control unit that controls the moisture applying unit, in which the moisture applying unit may adjust an amount of moisture to be applied to the roll body, and the control unit may adjust the amount of moisture to be applied to the roll body by controlling the moisture applying unit based on the detection result of the first detection unit.

According to that configuration, the first detection unit is capable of detecting the first moisture content of the surface of the roll body, and the surface of the roll body is a surface of the fabric before the ejection unit ejects the liquid. For this reason, by adjusting the amount of moisture to be applied to the roll body in accordance with an increase or decrease in the moisture content of the surface of the roll body, the moisture content of the surface of the fabric before the ejection unit ejects the liquid can be adjusted such that it does not deviate from a predetermined moisture content range in accordance with the type of fabric to be printed on.

(C) The liquid ejector may further include a second detection unit capable of detecting a second moisture content of the surface of the fabric after the fabric is pulled out from the roll body before the ejection unit ejects the liquid, in which the first detection unit may be provided upstream of the moisture applying unit in the direction of rotation of the roll body, and the control unit may adjust the amount of moisture to be applied to the roll body by controlling the moisture applying unit based on the detection result of the first detection unit and the detection result of the second detection unit.

According to that configuration, the first detection unit is provided upstream of the moisture applying unit in the direction of rotation of the roll body, and thus the first moisture content detected by the first detection unit is the moisture content of the fabric that is not in contact with air and to which moisture has been applied through another fabric coming in contact with the aforementioned fabric. When moisture is to be applied to the fabric, moisture is applied from an outer surface of the fabric of the first round by the moisture applying unit after the first detection unit detects the first moisture content. Thus, the second moisture content detected by the second detection unit is the moisture content of the fabric after moisture is applied from the outer surface of the fabric of the first round and the moisture content of the surface of the fabric before the ejection unit ejects the liquid. By calculating the amount of moisture applied to the fabric from the outer surface of the fabric of the first round by the moisture applying unit based on the difference between the first moisture content and the second moisture content, the amount of moisture to be applied to the roll body can be adjusted.

(D) The liquid ejector includes a second detection unit capable of detecting a second moisture content of a surface of the fabric after the fabric is pulled out from the roll body before the ejection unit ejects the liquid, and a control unit that controls the moisture applying unit, in which the moisture applying unit may adjust an amount of moisture to be applied to the roll body, and the control unit may adjust the amount of moisture to be applied to the roll body by controlling the moisture applying unit based on the detection result of the second detection unit.

According to that configuration, the second detection unit detects the second moisture content of the surface of the fabric after the fabric is pulled out from the roll body before the ejection unit ejects the liquid. For this reason, by adjusting the amount of moisture to be applied to the roll body in accordance with an increase or decrease in the moisture content of the surface of the fabric before the ejection unit ejects the liquid, the moisture content of the surface of the fabric before the ejection unit ejects the liquid can be adjusted such that it does not deviate from a predetermined moisture content range in accordance with the type of fabric to be printed on.

(E) The liquid ejector includes a housing unit with an opening through which the fabric can pass and capable of housing the roll body, a third detection unit capable of detecting a humidity inside the housing unit, and a control unit that controls the moisture applying unit, in which the moisture applying unit may apply moisture to the roll body through air inside the housing unit, and the control unit may adjust the amount of moisture to be applied to the roll body by controlling the moisture applying unit based on the detection result of the third detection unit.

According to that configuration, the moisture applying unit applies moisture to the roll body through air inside the housing unit housing the roll body. The amount of moisture contained in the air inside the housing unit depends on the humidity inside the housing unit. For this reason, by adjusting the amount of moisture to be applied to the roll body in accordance with the humidity inside the housing unit housing the roll body, the moisture content of the surface of the fabric before the ejection unit ejects the liquid can be adjusted such that it falls within a predetermined moisture content range in accordance with the type of fabric to be printed on.

(F) The liquid ejector includes a fourth detection unit capable of detecting an angular velocity of the roll body when the fabric is pulled out from the roll body, in which the control unit may adjust the amount of moisture to be applied to the roll body per unit time by controlling the moisture applying unit based on the detection result of the fourth detection unit.

According to that configuration, when the speed at which the fabric is pulled out from the roll body is constant, if the angular velocity of the roll body when the fabric is pulled out from the roll body is low, the time in which the outer surface of the fabric of the first round is in contact with the air inside the housing unit becomes longer. If the time in which the outer surface of the fabric of the first round is in contact with the air inside the housing unit becomes longer, the amount of moisture to be applied to the roll body increases. The fourth detection unit is a detection unit for detecting the length of time in which the outer surface of the fabric of the first round is in contact with the air inside the housing unit since it detects the angular velocity of the roll body. Thus, by adjusting the amount of moisture to be applied to the roll body per unit time based on the detection result of the fourth detection unit, change in the amount of moisture to be applied can be curbed even if the time in which the roll body is in contact with the air inside the housing unit changes.

(G) The liquid ejector includes a fifth detection unit capable of detecting a diameter of the roll body when the fabric is pulled out from the roll body, in which the control unit may adjust the amount of moisture to be applied to the roll body per unit time by controlling the moisture applying unit based on the detection result of the fifth detection unit.

According to that configuration, when the speed at which the fabric is pulled out from the roll body is constant, if the diameter of the roll body when the fabric is pulled out from the roll body is large, the time in which the outer surface of the fabric of the first round is in contact with the air inside the housing unit becomes longer. If the time in which the outer surface of the fabric of the first round is in contact with the air inside the housing unit becomes longer, the amount of moisture to be applied to the roll body increases. The fifth detection unit is a detection unit for detecting the length of time in which the outer surface of the fabric of the first round is in contact with the air inside the housing unit since it detects the diameter of the roll body. Thus, by adjusting the amount of moisture to be applied to the roll body per unit time based on the detection result of the fifth detection unit, change in the amount of moisture to be applied can be curbed even if the time in which the roll body is in contact with the air inside the housing unit changes.

(H) The liquid ejector includes a housing unit with an opening through which the fabric can pass and capable of housing the roll body, a third detection unit capable of detecting a humidity inside the housing unit, an air intake portion that takes air into the housing unit from the outside of the housing unit, and a discharge portion that discharges air from the inside of the housing to the outside of the housing unit, in which the moisture applying unit may apply moisture to the roll body through air inside the housing unit, at least one of the air intake portion and the discharge portion can adjust the volume of air flowing, and the control unit may adjust the volume of flowing air by controlling at least one of the air intake portion and the discharge portion based on the detection result of the third detection unit.

According to that configuration, because the moisture applying unit applies moisture to the roll body through the air inside the housing unit, if the humidity inside the housing unit is too high, the increase of the moisture content of the fabric may not immediately stop even if the moisture applying unit is stopped. In such a case as well, an increase in the moisture content of the fabric can be curbed by adjusting the volume of air flowing inside the housing unit and outside the housing unit based on the humidity inside the housing unit.

(I) The liquid ejector may include a shaft member around which the fabric is wound, a sixth detection unit that detects a temperature of a contact surface of the shaft member in contact with the fabric, and a cooling unit that cools the shaft member, in which the moisture applying unit applies vapor to the roll body to apply the moisture to the roll body, and the control unit may control the cooling unit such that the temperature detected by the sixth detection unit is lower than or equal to a dew point temperature of the vapor inside the housing unit based on the detection result of the third detection unit.

According to that configuration, when the shaft member around which the fabric is wound is cooled and thus the temperature of the contact surface of the shaft member in contact with the fabric becomes lower than or equal to the dew point temperature, the portion of the fabric in contact with the surrounding air has water condensation. This can increase the amount of moisture applied to the fabric from the surrounding air.

(J) The liquid ejector includes a control unit that controls the moisture applying unit, in which the moisture applying unit may adjust the range in which the moisture is applied in a width direction along a rotational axis of the roll body, and the control unit may adjust the range in which the moisture is applied to the roll body in the width direction in accordance with a range in which the liquid is ejected in the width direction.

According to that configuration, a range in which moisture is applied to the roll body in the direction along the rotational axis of the roll body is adjusted according to the range in which the liquid is ejected. As moisture is applied to the fabric, for example, the state of bleeding caused by ejection of the liquid to the fabric changes. For this reason, the range in which moisture is required varies depending on the range in which the liquid is ejected. Since moisture is applied only in the moisture-required range by adjusting the range in which moisture is applied to the roll body, the amount of moisture used can be reduced.

(K) The liquid ejector may include a moisture removing unit that removes moisture from the roll body held by the holding unit.

According to that configuration, when the moisture removing unit removes moisture from the roll body around which the fabric having air permeability is wound, dry air passes through the fabric through the voids of the weave of the fabric of the first round. For this reason, when moisture is removed from the fabric of the first round, some degree of moisture can be removed from the fabric from the second round as well for a short period of time. As a result, since the time in which moisture is removed the fabric becomes longer, it is possible to remove a large amount of moisture from the fabric before the ejection unit ejects the liquid within a limited period of time. That is, this liquid ejector makes it possible to apply a large amount of moisture to the fabric before the ejection unit ejects the liquid within a limited period of time, and to remove a large amount of moisture therefrom within a limited period of time.

What is claimed is:

1. A liquid ejector comprising:

a holding unit configured to hold a roll body around which a fabric is wound;

a conveyance unit configured to pull out the fabric from the roll body to convey the fabric;

an ejection unit configured to eject a liquid to the fabric pulled out from the roll body;

a moisture applying unit configured to apply moisture to the roll body held by the holding unit;

a first detection unit configured to detect a first moisture content of a surface of the roll body; and a control unit configured to control the moisture applying unit, wherein the moisture applying unit is configured to adjust an amount of moisture to be applied to the roll body, and the control unit adjusts the amount of moisture to be applied to the roll body by controlling the moisture applying unit based on a detection result of the first detection unit.

2. The liquid ejector according to claim 1, further comprising:

a second detection unit configured to detect a second moisture content of a surface of the fabric after the fabric is pulled out from the roll body before the ejection unit ejects the liquid, wherein the first detection unit is provided upstream of the moisture applying unit in a direction of rotation of the roll body, and the control unit adjusts an amount of moisture to be applied to the roll body by controlling the moisture applying unit based on a detection result of the first detection unit and a detection result of the second detection unit.

3. The liquid ejector according to claim 1, further comprising:

a housing unit with an opening through which the fabric is passable and configured to house the roll body;

a third detection unit configured to detect a humidity inside the housing unit;

an air intake portion configured to take air into the housing unit from the outside of the housing unit; and a discharge portion configured to discharge air from the inside of the housing to the outside of the housing unit, wherein the moisture applying unit is configured to apply the moisture to the roll body through air inside the housing unit, at least one of the air intake portion and the discharge portion is configured to adjust a volume of flowing air, and the control unit adjusts the volume of flowing air by controlling at least one of the air intake portion and the discharge portion based on a detection result of the third detection unit.

4. The liquid ejector according to claim 3, further comprising:

a shaft member around which the fabric is wound;

a sixth detection unit configured to detect a temperature of a contact surface of the shaft member in contact with the fabric; and a cooling unit configured to cool the shaft member, wherein the moisture applying unit applies vapor to the roll body to apply the moisture to the roll body, and the control unit controls the cooling unit such that a temperature detected by the sixth detection unit is lower than or equal to a dew point temperature of the vapor in the housing unit based on the detection result of the third detection unit.

5. The liquid ejector according to claim 1, further comprising a moisture removing unit configured to remove moisture from the roll body held by the holding unit.

6. A liquid ejector comprising:

a holding unit configured to hold a roll body around which a fabric is wound;

a conveyance unit configured to pull out the fabric from the roll body to convey the fabric;

an ejection unit configured to eject a liquid to the fabric pulled out from the roll body;

a moisture applying unit configured to apply moisture to the roll body held by the holding unit;

a detection unit configured to detect moisture content of a surface of the fabric after the fabric is pulled out from the roll body before the ejection unit ejects the liquid; and a control unit that controls the moisture applying unit, wherein the moisture applying unit is configured to adjust an amount of moisture to be applied to the roll body, and the control unit adjusts the amount of moisture to be applied to the roll body by controlling the moisture applying unit based on a detection result of the detection unit.

7. A liquid ejector comprising:

a holding unit configured to hold a roll body around which a fabric is wound;

a conveyance unit configured to pull out the fabric from the roll body to convey the fabric;

an ejection unit configured to eject a liquid to the fabric pulled out from the roll body;

a moisture applying unit configured to apply moisture to the roll body held by the holding unit; and a control unit configured to control the moisture applying unit, wherein the moisture applying unit is configured to adjust a range in which the moisture is applied in a width direction along a rotational axis of the roll body, and the control unit adjusts the range in which the moisture is applied to the roll body in the width direction in accordance with a range in which the liquid is ejected in the width direction.

* * * * *